(12) United States Patent
Jakobsson

(10) Patent No.: US 9,798,896 B2
(45) Date of Patent: Oct. 24, 2017

(54) MANAGING UNWANTED TRACKING ON A DEVICE

(71) Applicant: QUALCOMM Incorporated, San Diego, CA (US)

(72) Inventor: Bjorn Markus Jakobsson, Portola Valley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 14/745,742

(22) Filed: Jun. 22, 2015

(65) Prior Publication Data

US 2016/0371507 A1 Dec. 22, 2016

(51) Int. Cl.
| | |
|---|---|
| G06F 21/62 | (2013.01) |
| H04L 12/26 | (2006.01) |
| H04L 29/06 | (2006.01) |
| H04L 29/08 | (2006.01) |

(Continued)

(52) U.S. Cl.
CPC .... *G06F 21/6263* (2013.01); *G06F 17/30876* (2013.01); *G06F 21/552* (2013.01); *G06F 21/554* (2013.01); *H04L 43/06* (2013.01); *H04L 63/04* (2013.01); *H04L 67/02* (2013.01); *H04L 67/143* (2013.01); *H04L 67/146* (2013.01);

(Continued)

(58) Field of Classification Search
CPC ...... G06F 21/60; G06F 21/62; G06F 21/6218; G06F 21/552; G06F 21/554; G06F 17/30876; G06F 2221/2143; G06F 21/6263; H04L 43/06; H04L 63/04; H04L 67/143; H04L 67/146; H04L 67/22; H04L 67/02

See application file for complete search history.

(56) References Cited

U.S. PATENT DOCUMENTS

| | | | |
|---|---|---|---|
| 7,603,356 B2 | 10/2009 | Schran et al. | |
| 8,225,405 B1 | 7/2012 | Peterson et al. | |
| 8,312,543 B1 | 11/2012 | Gardner | |

(Continued)

OTHER PUBLICATIONS

International Search Report and Written Opinion—PCT/US2016/029170—ISA/EPO—Jun. 24, 2016.

*Primary Examiner* — Robert Leung
*Assistant Examiner* — Ayoub Alata
(74) *Attorney, Agent, or Firm* — The Marbury Law Group, PLLC

(57) ABSTRACT

Methods, devices, systems, and non-transitory process-readable storage media manage unwanted tracking by evaluating conditions encountered by a browser application during sessions with websites. Embodiment methods performed by a processor of a computing device may include operations for identifying predefined browsing execution conditions encountered by the computing device during a session with a website, determining whether unwanted tracking of the computing device likely exists based on the identified predefined browsing execution conditions, and performing a corrective action in response to determining that the unwanted tracking of the computing device likely exists based on the identified predefined browsing execution conditions. Embodiment methods may also include operations for identifying a type of condition for each of the predefined browsing execution conditions and determining whether a number of each type of condition exceeds a predefined threshold for each type of condition for the session.

21 Claims, 10 Drawing Sheets

(51) Int. Cl.
*G06F 17/30* (2006.01)
*G06F 21/55* (2013.01)
(52) U.S. Cl.
CPC ...... *H04L 67/22* (2013.01); *G06F 2221/2143* (2013.01)

(56) References Cited

U.S. PATENT DOCUMENTS

| | | |
|---|---|---|
| 2011/0191664 A1 | 8/2011 | Sheleheda et al. |
| 2011/0208850 A1* | 8/2011 | Sheleheda ............ G06F 21/6263 709/223 |
| 2011/0214163 A1 | 9/2011 | Smith et al. |
| 2012/0272338 A1 | 10/2012 | Falkenburg et al. |
| 2012/0304286 A1* | 11/2012 | Croll .................... G06F 21/6263 726/22 |
| 2013/0067588 A1 | 3/2013 | Roy et al. |
| 2014/0337991 A1 | 11/2014 | Croll et al. |

* cited by examiner

MANAGING UNWANTED TRACKING ON A DEVICE

BACKGROUND

Websites are typically configured to cause user computing devices executing browser applications (or browsers) to perform operations and/or store data (e.g., HTML cookies, local shared objects (LSOs), or other data stored in a browser or device cache) when accessing those sites. Often, such operations or stored data have legitimate and useful purposes, such as speeding up web access and automatically activating use of security protocols (e.g., hypertext transfer protocol secure (HTTPS), etc.). Device users typically welcome trusted service providers to store data on user computing devices in order to recognize the users, suppress fraud, and/or simplify authentications.

SUMMARY

Various aspects provide methods, computing devices executing such methods, systems implementing such methods, and non-transitory process-readable storage media storing instructions for a user computing device to control tracking by evaluating conditions encountered by a browser application during sessions with websites. Example methods implemented on a processor of a computing device to manage website tracking may include operations for identifying predefined browsing execution conditions encountered by the computing device during a session with a website, determining whether unwanted tracking of the computing device likely exists based on the identified predefined browsing execution conditions, and performing a corrective action in response to determining that the unwanted tracking of the computing device likely exists based on the identified predefined browsing execution conditions. In some aspects, identifying the predefined browsing execution conditions encountered by the computing device during the session with the website may include identifying a presence of stored data that may include at least one of an HTML cookie, a script, marker data, an executable code, or any combination thereof. In some aspects, determining whether the unwanted tracking of the computing device likely exists based on the identified predefined browsing execution conditions may include determining whether links to a document or source within stored data of the session differs from links to a document or source within archived data of a previous session for the website, and determining that the unwanted tracking of the computing device likely exists in response to determining that links to a document or source within the stored data of the session differs from links to a document or source within archived data of a previous session for the website.

In some aspects, identifying the predefined browsing execution conditions encountered by the computing device during the session with the website may include identifying an occurrence of at least one of a suspect redirect, storage of an element in a browser cache, an attempt to access the element in a browser cache, access to a canvas storage area, or an execution of a script that attempts to modify a state of a browser, or any combination thereof. Examples of suspect redirects include a 401 redirect, an Iframe redirect, special meta tags within HTML source (e.g., meta refresh), an HTTP redirect, a 301 moved permanently redirect, a 302 "Found" redirect, a 307 "Temporary" redirect, a Javascript® redirect, an htaccess redirect, a Frameset redirect, and/or various other redirect types/methods.

In some aspects, determining whether the unwanted tracking of the computing device likely exists based on the identified predefined browsing execution conditions may include identifying a type of condition for each of the predefined browsing execution conditions, determining whether a number of each type of condition exceeds a predefined threshold for each type of condition for the session, and determining that the unwanted tracking of the computing device likely exists in response to determining that a number of at least one type of condition exceeds a corresponding predefined threshold for the session.

In some aspects, determining whether the unwanted tracking of the computing device likely exists based on the identified predefined browsing execution conditions may include determining whether the unwanted tracking of the computing device likely exists based on the identified predefined browsing execution conditions after the session has concluded. In some aspects, performing the corrective action in response to determining that the unwanted tracking of the computing device likely exists based on the identified predefined browsing execution conditions may include selecting one or more corrective actions from a plurality of predefined actions based on the identified predefined browsing execution conditions, and performing the selected one or more corrective actions.

In some aspects, the plurality of predefined actions may include at least one of nullifying stored data associated with the identified predefined browsing execution conditions of the session, adjusting response data requested by the website, blocking access to local data on the computing device, generating a message for a user, generating a configuration file, or terminating the session, or any combination thereof. In some aspects, nullifying the stored data associated with the identified predefined browsing execution conditions of the session may include one or more of deleting the stored data from memory of the computing device, modifying the stored data from the memory of the computing device, or relocating the stored data within the memory of the computing device, or any combination thereof. In some aspects, adjusting the response data may include at least one of randomizing the response data, omitting a portion of information requested by the website, or providing inaccurate or imprecise information within the response data, or any combination thereof. In some aspects, blocking the access to the local data on the computing device may include preventing tracking elements of the session from reading or writing to a local buffer on the computing device.

In some aspects, the method may further include receiving a list of predefined browsing execution conditions associated with the unwanted tracking from a remote device, wherein the received list is aggregated based on reports from a plurality of user computing devices, and determining whether the identified predefined browsing execution conditions of the session match the predefined browsing execution conditions associated with the unwanted tracking in the received list, wherein performing the corrective action in response to determining that the unwanted tracking of the computing device likely exists may include performing the corrective action in response to determining that the identified predefined browsing execution conditions of the session match the predefined browsing execution conditions associated with the unwanted tracking in the received list.

In some aspects, the received list may include corrective actions corresponding to the predefined browsing execution conditions associated with the unwanted tracking in the received list, and wherein performing the corrective action may include performing the corrective actions in the received list corresponding to the matching predefined browsing execution conditions associated with the unwanted tracking in the received list. In some aspects, the method may further include generating a report based on the performed corrective action and the identified predefined browsing execution conditions of the session, and transmitting the generated report to a remote device configured to aggregate data from a plurality of user computing devices.

Further aspects include a computing device configured with processor-executable instructions for performing operations of the methods described above. Further aspects include a non-transitory processor-readable medium on which is stored processor-executable instructions configured to cause a computing device to perform operations of the methods described above. Further aspects include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

The various embodiments provide systems and methods for evaluating and controlling efforts to track a user computing device's access to websites. In some aspects, the device may evaluate conditions encountered by a browser application during sessions with each website in order to determine a probability that unwanted tracking is being conducted for each encountered condition. For example unwanted tracking may be determined to likely exist when links to a document or source within stored data of the session differs from links to a document or source within archived data of a previous session for the website and/or when a number of a certain type of encountered condition exceeds a predefined threshold for a session. When unwanted tracking is determined to likely exist (e.g., the unwanted tracking is occurring or is likely to occur in the future), the user computing device may perform various actions to mitigate, remove, or disable such unwanted tracking.

The word "exemplary" is used herein to mean "serving as an example, instance, or illustration." Any implementation described herein as "exemplary" is not necessarily to be construed as preferred or advantageous over other implementations.

Figure 9:
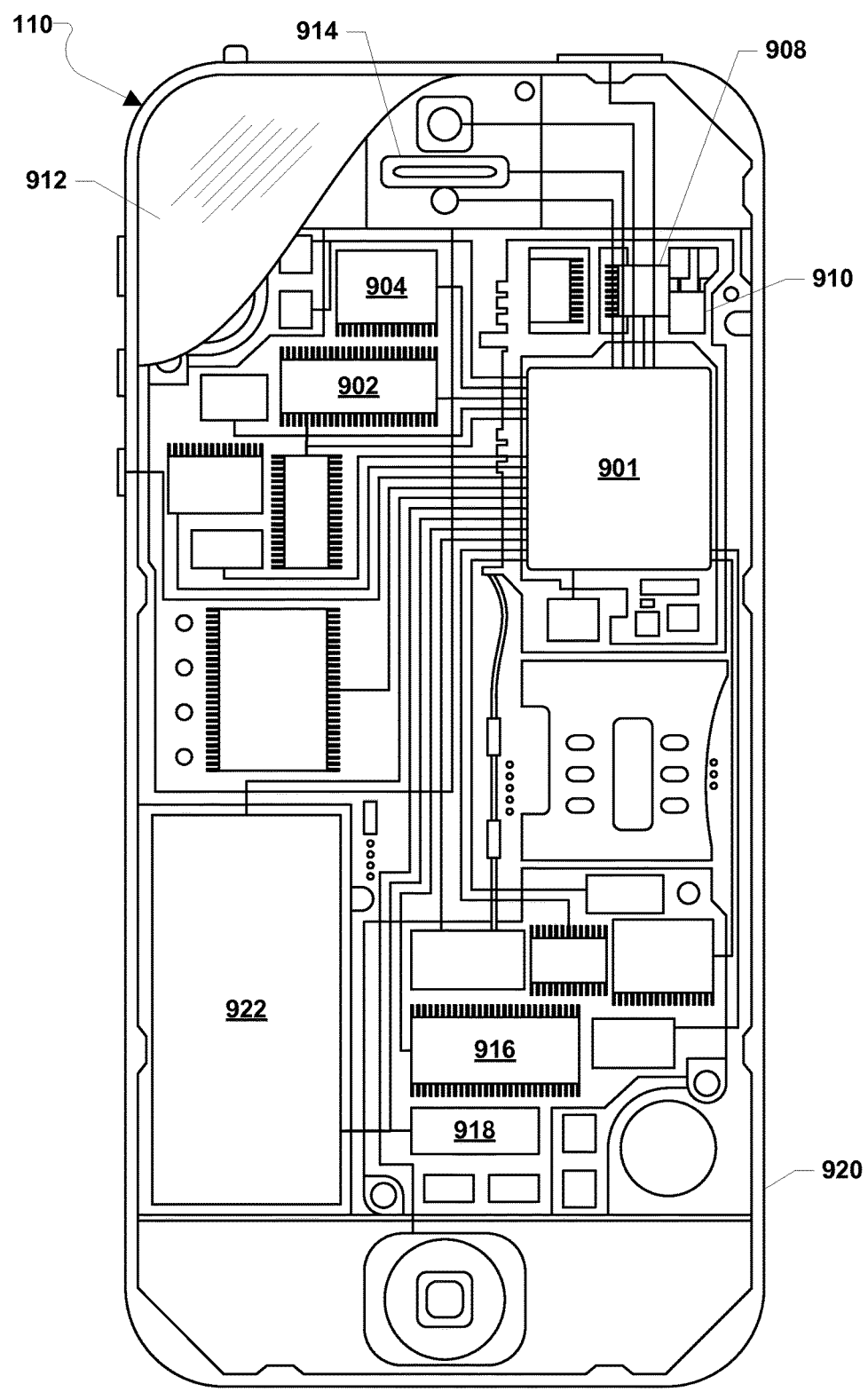
FIG. 9 is a component block diagram of a mobile computing device suitable for use in some embodiments.

The term "computing device" is used herein to refer to an electronic device equipped with at least a processor. Examples of computing devices may include mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, server computing devices, an appliance, automobile, an entertainment device (e.g., a music or video device), a headset (e.g., headphones, an earpiece, etc.), and a medical device (e.g., a biometric sensor, a heart rate monitor, a pedometer, an EKG device, etc.). In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.). In the various descriptions of this disclosure, a computing device used by a user may be referred to as a "user computing device." An exemplary user computing device (e.g., a smartphone-type mobile computing device) is illustrated in FIG. 9.

Figure 10:
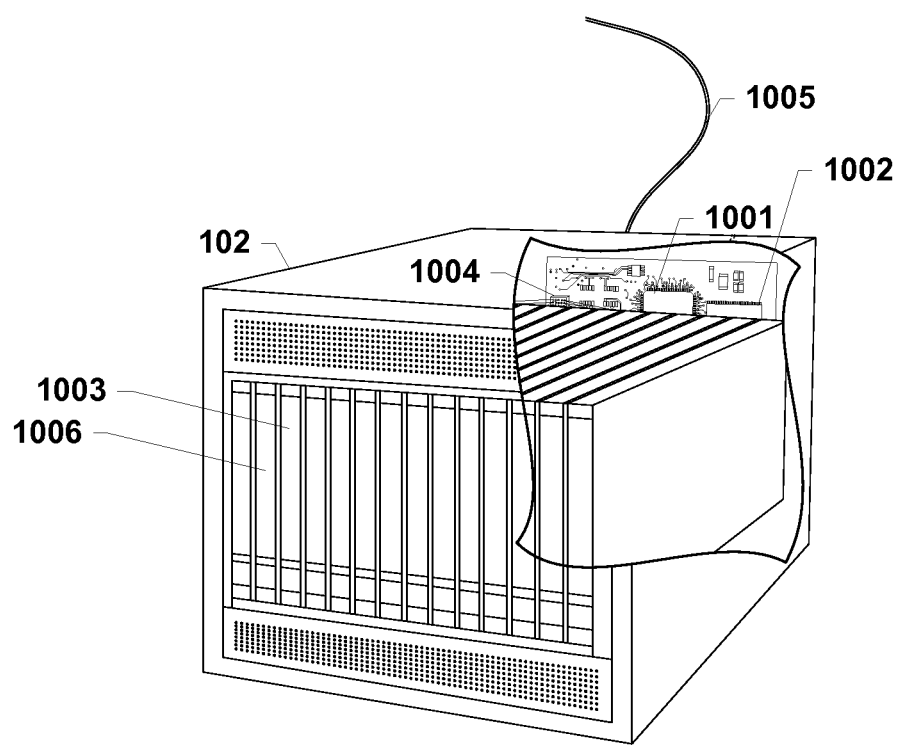
FIG. 10 is a component block diagram of a server computing device suitable for use in some embodiments.

The term "server" is used to refer to any computing device capable of functioning as a server, such as a master exchange server, web server, mail server, document server, and a personal or mobile computing device configured with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein. An exemplary server is illustrated in FIG. 10.

The terms "session" and "website session" are used interchangeably herein to refer to an execution period experienced by a browser application that occurs between two events (i.e., "insulating events") that stop browser state information from being carried automatically by the browser application. In other words, a session may be defined by activity (e.g., page views) occurring after the browser first accesses a website and until the point when no state information about the website (e.g., such as in the form of uniform resource locator (URL) parameters) can be carried forward, such as with respect to a browser's activities with a different website. For example, a browser may begin a new session in response to detecting click on a bookmark, receiving a URL into an address bar, and/or accessing a trusted search engine, all of which may be insulating events because no state information about the original website may be carried forward after these events are experienced by the computing device. This may be in contrast to a scenario in which a browser accesses one website, the user clicks a link, and the browser proceeds to another page. In some cases, this sequence of events may be only one session because a state may be carried over (e.g., session ID or unique ID used to request URL might have data in it).

A user computing device executing a browser may encounter various actions, events, and data exchanged from the website during such sessions. For example, "cookie synching" may be accomplished during a session, as changes in the count of observable tracking items (e.g., cookies, redirects, etc.) may be detectable during a period between two insulating events, such as user clicks.

The term "predefined browsing execution condition" is used herein to refer to data, signaling, and/or other contexts processed or experienced at a user computing device that may have the technical capability of being used for tracking by website operators. Predefined browsing execution conditions may include the presence of data well-known to be used for tracking (i.e., "tracking items"), such as HTML cookies. However, predefined browsing execution conditions may also include other data or occurrences that may be identified as related to tracking efforts only after analysis, such as an evaluation of data stored during a session in combination with other conditions encountered during the session, such as reads and/or writes to browser cache.

There are legitimate and useful purposes for tracking visitors to a website, and the practice of using stored tracking items (commonly referred to as "cookies") to track visitors to web sites is nearly universal. Typically a cookie is stored on user computers when a website is accessed so that the next time the user visits the website, the cookie can be accessed to inform the website of the prior visitation. For example, some cookies may be set by website operators in order to merely identify, locate, and/or categorize visiting user computing devices to a website, which can be a pervasive breach of privacy for many users. For example, in order to identify repeat visitors to a site along with certain related information (e.g., demographics, product preferences, etc.), some websites may place one or more HTTP cookies, files, or other data structures in various storage locations on user computing devices (e.g., browser cache, etc.) for later interrogation by the websites.

Despite these legitimate and useful purposes for tracking visitors to websites, other website content received at user computing devices may be used for malevolent or undesirable tracking purposes. In particular, certain tracking items or combinations of tracking items may be more likely related to unwanted tracking.

The various embodiments provide methods, devices, systems, and non-transitory process-readable storage media for a user computing device to control tracking by evaluating conditions encountered by a browser application during sessions with websites. In general, the user computing device may continually evaluate data that is stored, accessed or processed with respect to a particular session with a website and identify particular conditions often associated with tracking (i.e., predefined browsing execution conditions). For example, the user computing device may identify the presence (and number) of HTML cookies and/or redirects caused by received HTML code, such as a 401 redirect, an Iframe redirect, special meta tags within HTML source (e.g., meta refresh), an HTTP redirect, a 301 moved permanently redirect, a 302 "Found" redirect, a 307 "Temporary" redirect, a Javascript® redirect, an htaccess redirect, a Frameset redirect, and/or various other redirect types/methods (any combination of which may be referred to herein as "suspect redirect(s)"). As further examples, the user computing device may identify certain portions of the browser cache that are read during the website session, and/or the occurrence of an execution of a script that attempts to modify the state of the browser.

As the various predefined browsing execution conditions may or may not be unwanted, the evaluations may determine a probability of unwanted tracking for each encountered condition. For example, a certain number of cookies from the website may be determined to be acceptable or normal and thus not likely to be unwanted tracking, whereas a higher number of cookies from the website may indicate a high probability of unwanted tracking. In this manner, the user computing device may be configured to intelligently use conditions corresponding to potential tracking attempts, such as the context, type, and number of stored HTML cookies, to detect tracking that is likely to be unwanted as well as automatically perform operations to avoid the tracking.

If the user computing device determines that there is (or was) unwanted tracking, the user computing device may perform various actions to mitigate, remove, or disable such unwanted tracking. For example, the user computing device may delete stored data, generate "fuzzed" response data requested by the website, and/or block access to local data. In this manner, the user computing device may automatically perform operations to avoid unwanted tracking.

In some embodiments, the user computing device may be configured to use a heuristic detection mechanism (or heuristic techniques) that detects clusters of events that occur within the same session and that may be associated with unwanted tracking attempts by websites. The heuristic techniques may identify a number of predefined browsing execution conditions (e.g., stored cookies, redirects, etc.) that are experienced locally during a website session. In various embodiments, such heuristics techniques may be considered automatic, client-side functionalities that may not require the user computing device to receive information from the user or other sources to help delineate conditions that may indicate unwanted tracking.

Different types or schemes of unwanted tracking conditions may be identified, and each may be associated with different thresholds. When the observed conditions of a session exceed one or more predefined thresholds, the user computing device may perform corrective actions (e.g., clear a state, delete the stored tracking items, etc.). For example, if a number of cross-domain references commonly used for cookie synching exceeds a threshold amount, associated data may be deleted. As another example, using a number threshold that indicates any more than five tracking cookies for a session likely corresponds to unwanted tracking activity, and the user computing device may implement relocation of cookies in excess of five during the session. As another example, the user computing device may perform a corrective action when only a single iframe with a 401 redirect (e.g., from www.patentexample.com to www-.patentexample.com/ASDFASDF/) or a single htaccess redirect occurs. As another example, the user computing device may perform a corrective action when a redirect from a site (e.g., www.patentexample.com) to a unique subdomain (e.g., www.patentexample.site.com) exceeds a threshold.

In some embodiments, such thresholds may be user-defined. For example, the user computing device may use a simple user-set slider defining acceptable trade-offs between privacy and functionality, such as by setting values for usability (e.g., less authentication effort), security (e.g., better fraud prevention), and speed (e.g., reduced rendering delays for the browser).

In some embodiments, the user computing device may be configured to detect that unwanted tracking likely exists based on changes in predetermined browsing execution conditions in between sessions with the same website. For example, the user computing device may transfer tracking items, stored during a first session with the website, to temporary locations so that new tracking items may be stored during a subsequent session with the same website. The user computing device may then compare the data of the two copies of the tracking items to identify similarities (i.e., the level of entropy).

If the tracking items are the same (i.e., low entropy), the user computing device may determine that the tracking items are unlikely to be malevolent and thus may be cleared for future use. However, if the tracking items are different (i.e., high entropy), the user computing device may determine that the website is likely conducting unwanted tracking. For example, a user computing device may visit the same webpage twice, and the stored data from both visits may be different, such as a link within the stored data from a second visit to the webpage resolves to a different document or source than the link within the stored data from the first visit to the webpage. In other words, there is a difference between the archived and currently stored data that is not as simple as different ads being shown or different news articles stored as a result of the visits to the webpage. In such a case where there is a difference between the links to documents or sources in the current and archived data, the user computing device may perform various actions to mitigate the unwanted tracking as described below.

In response to detecting potential unwanted tracking based on predefined browsing execution conditions identified during a session, the user computing device may employ various countermeasures or "corrective actions." Examples of corrective actions may include removing stored tracking items (e.g., HTML cookies, LSOs/Flash® cookies, etc.), altering (or "fuzzing") responses to requests from websites in order to provide inaccurate or incomplete response data and create random fluctuation (e.g., give wrong operating system version in response to requestor, etc.), refusing or blocking access to the browser cache or other storage locations on the user computing device, and/or preventing other operations requested by a website (e.g., canvas fingerprinting).

Such corrective actions may be chosen based on the characteristics of the predefined browsing execution conditions themselves and may be conducted on a threat-by-threat basis. For example, when the user computing device determines that the number of HTML cookies is too numerous for a website session, which may indicate unwanted tracking, the user computing device may select the corrective action of deleting the HTML cookies to avoid subsequent tracking. As another example, the user computing device may adjust (or fuzz) a user-agent string in a message to a web server in order to avoid likely canvas fingerprinting.

The following is a non-limiting illustration of a user computing device utilizing a heuristic technique that calculates a score that may be compared to a threshold to determine whether corrective actions are needed. The computing device may be configured to evaluate browser activity during a session with a website to identify particular conditions, including the storage of HTTP cookies in browser storage (or cache), the occurrence of various forms of suspect redirects, cached HTML files, and cached scripts (e.g., Javascript®). Examples of suspect redirects include 401 redirects, an Iframe redirect, special meta tags within HTML source (e.g., meta refresh), an HTTP redirect, a 301 moved permanently redirect, a 302 "Found" redirect, a 307 "Temporary" redirect, a Javascript® redirect, an htaccess redirect, a Frameset redirect, etc.

Any encountered HTTP cookies may be primarily associated with tracking, and therefore may cause the computing device to adjust (or increase) the score. Regarding suspect redirects, as some redirects may be used for tracking and others may be for other legitimate uses, the computing device may be configured to adjust the score based on the amount or context of redirects. For example, if only one redirect is encountered, the computing device may increase the score a first amount, as it may be possible that the single redirect is being used to encode data for tracking. However, if there are two different redirects in two different sessions (whether for the same browser or not), the computing device may adjust the score a second amount, as such multiple redirects may be a stronger sign that redirects are being used for tracking. If the score exceeds a predefined threshold, the computing device may erase all stored data for the session with the website, including data that may be "innocent" and probably not used for tracking purposes.

Nefarious websites may discover and attempt to counteract the thresholds/logic of heuristic mechanisms utilized by the user computing device. For example, sophisticated website operators may utilize "ever-cookies" or "zombie" cookies that may survive on the user computing device over time and/or purposefully limit the number and kind of predefined browsing execution conditions (e.g., stored tracking items) that can be experienced during a session in order to evade known thresholds. As another example, fast-flux techniques or other techniques to circumvent cross-site scripting protections (XSS) may be used by some nefarious entities to enable unwanted tracking. As such unwanted tracking methods sometimes may only be identified using large-scale analysis relying on multiple data feeds, some embodiments may use crowd-sourced aggregated data to improve tracking management at the user computing device.

In embodiments using crowd-sourced aggregated data to improve tracking management, the user computing device may be configured to also utilize aggregated data (referred to herein as "defense lists") that is received from a crowd-sourcing server to improve or supplement the functionalities of the heuristic techniques described above. Such aggregated data may be generated by the crowd-sourcing server based on reports received from a plurality of user computing devices that have encountered a common website. For example, based on multiple reports from user computing devices, the crowd-sourcing server may generate defense lists that include information of tracking conditions (e.g., numbers of tracking items or occurrences of redirects, etc.) that have been determined by others as related to unwanted tracking. In other words, a defense list may be a list of predefined browsing execution conditions associated with the unwanted tracking from a remote device.

Using aggregated defense lists may enable the user computing device to detect nefarious, insistent attempts to thwart the threshold/logic of the heuristic techniques without being required to independently maintain the significant storage and processing resources needed for developing such aggregated historical data. For example, even if the number of a certain type of stored tracking item has not been exceeded during a session, the user computing device may use the defense list data to determine that the conditions or context for a session with a certain website likely indicate unwanted tracking, and thus the user computing device may take one of the corrective actions described above to remove the tracking.

In some embodiments, any actions taken in response to detecting tracking that is likely unwanted may be reported to the crowd-sourcing server, which may combine reports from other user computing devices to generate the aggregated defense lists. For example, based on identifying tracking that is likely unwanted due to a large number of stored cookies and performing the corrective action of relocating the cookies to an alternate storage location, the user computing device may generate and send to the crowd-sourcing server a report that indicates the identifier of the website (e.g., URL), the identified predetermined browsing execution conditions, the basis for determining the presence of unwanted tracking (e.g., the number of stored cookies exceeding a threshold), and/or the corrective action taken to remedy the unwanted tracking (e.g., relocation).

In some embodiments, the user computing device may receive defense lists from the crowd-sourcing server that are tailored to the particular needs/experiences of the user computing devices. For example, a received defense list may include data indicating conditions the community at large experienced when visiting URLs known to be frequently used by the user computing device, in the same language used by the user of the user computing device, and/or otherwise preferred by the user of the user computing device. In some embodiments, receiving defense lists may be an opt-in condition accepted by the user computing device. In some embodiments, the user computing device may only receive aggregated defense lists in response to transmitting report data to the crowd-sourcing server. For example, the user computing device may be required to participate in crowd-sourcing data collection prior to receiving any crowd-sourced data that may be used to thwart insistent tracking. In some embodiments, the crowd-sourcing server may only transmit the defense lists to user computing devices configured to execute a particular browser application associated with the crowd-sourcing server.

The various embodiment techniques may be used exclusively or in combination with other tracking avoidance measures. In some embodiments, in addition to using an heuristics approach and/or aggregated defense lists to identify potential unwanted tracking conditions, the user computing device may also utilize "white list" data (i.e., lists of websites that are known to be trusted or otherwise not associated with unwanted tracking) and/or "black list" data (i.e., lists of websites that are known to be untrustworthy regarding unwanted tracking). For example, in response to detecting tracking for a website that is likely unwanted, the user computing device may override any corrective actions based on the website being listed on a "white list" generated by the user and/or some other party. Such lists may be generated locally by the user computing device, such as based on user inputs, and/or based on data received from remote sources, such as a security service provider, original equipment manufacturer (OEM), and/or carrier remote servers that are configured to deliver up-to-date lists of trusted or untrustworthy websites.

In some embodiments, the crowd-sourcing server may be configured to deliver both defense lists and/or simple, curated blacklists to participating user computing devices, such as those devices that have opted into a participation scheme. For example, the crowd-sourcing server may be configured to freely distribute simple blacklist data of potentially nefarious website URLs to any and all interested devices; however, the crowd-sourcing server may only transmit aggregated defense lists to participating, opt-in devices. The various embodiment techniques may include detection operations and data that are distinct from conventional white-listing/black-listing schemes.

In some embodiments, user computing devices may be configured to perform various functionalities or combinations of functionalities as part of a subscription service. For example, a user computing device may be configured to only identify certain types of unwanted tracking based on a level of subscription (or absence of a subscription), whereas another user computing device may be configured to identify all known unwanted tracking based on a subscription with a third-party cloud-sourcing service. In some embodiments, unsubscribed user computing devices may be enabled to correct unwanted tracking from predefined sources (e.g., websites defined in downloaded lists, etc.).

In some embodiments, the user computing device may be configured to utilize user-defined preferences when identifying tracking that is likely unwanted. For example, based on a setting from an interactive slider, a user may indicate trade-offs between privacy and functionality, such as usability (e.g., less authentication effort) versus security (e.g., better fraud prevention) versus speed (e.g., reduced rendering delays for the browser). Such user-defined preferences may adjust or otherwise control the thresholds used to determine whether predetermined browser execution conditions indicate the likely existence of unwanted tracking.

The following is an example process for controlling tracking according to some embodiments. During or after a session, the user computing device may identify all predefined browsing execution conditions encountered during the session. The user computing device may then optionally erase all identified tracking items within the session that correspond to items in a predefined blacklist and/or additional browser state data that are believed to potentially be used for unwanted tracking (e.g., erase browser state data for the duration of the session after detection). The user computing device may compute a score based on the remaining identified predefined browsing execution conditions and a scoring function (e.g., score and/or function selected according to a user configuration setting, etc.). The user computing device may erase tracking items and/or additional browser state data within the session believed to potentially be used for tracking in response to determining the score exceeds a first threshold. The user computing device may determine whether the score exceeds a second threshold and, if so, generate a report, including tracking information, session information, and contextual information (such as URLs visited) when allowed by privacy settings of the user. The user computing device may transmit the report to a crowd-sourcing server for aggregation operations when there is a suitable opportunity (e.g., Wi-Fi connection, high available battery). Further, the user computing device may receive updates of the aggregation by the crowd-sourcing server (e.g., defense lists).

Although some embodiment techniques may or may not utilize data that directly lists the identities of potential nefarious or trusted websites, the embodiment techniques are not mere blacklist technology. Unlike such conventional technologies, some embodiment techniques may utilize so-called "defense lists" that include data describing predefined browsing execution conditions that may be indicative of unwanted tracking by websites. By using such defense lists, the user computing device may improve processes designed to observe conditions existing during website sessions and to compute probabilities that such conditions are likely related to unwanted tracking, such as based on a number and type of the observed conditions during the session. Further, the embodiment techniques may not utilize conventional blacklists or reputation lists that are pointedly curated by a central authority, such as in response to user complaints. Instead, the embodiment techniques may utilize aggregated or combined defense lists based on experiences of a plurality of user computing devices accessing similar websites. For example, such defense lists may include descriptions of tracking conditions that are likely unwanted that numerous user computing devices worked to correct in the recent past and that may be used by the user computing device in real-time (or on-the-fly) when evaluating current, local browsing conditions for enacting needed countermeasures to tracking that is likely unwanted.

Additionally, the embodiment techniques may employ methods that are different from malware and/or virus detection. In other words, the embodiment techniques identify and delimit bothersome tracking based on contextual information during a session, not necessarily predefined lists of sources, such as are delivered for use with anti-virus software. Unlike malware countermeasures, the embodiment techniques may identify ephemeral occurrences, such as script executions associated with a website that run for an instant to collect information before going away. In this way, the embodiment techniques function in a reactive manner, judging user computing device experiences after the fact, in order to prevent future events that may lead to unwanted tracking.

The embodiment techniques are further distinguished from conventional technologies that simply establish a communication channel with end users regarding the presence or activity of tracking elements. For example, the user computing device configured with the embodiment techniques may be configured to automatically perform appropriate corrective action in response to identifying tracking that is likely unwanted and is not required to (but may) provide real-time rendered data to indicate to a user that a website may be conducting tracking. Further, although some embodiments may enable users to provide feedback or preferences, the embodiment techniques may not require users to make decisions regarding the presence of or ways of mitigating tracking that is likely unwanted. For example, instead of requesting direction from a user regarding a potential tracking situation, the user computing device configured with the embodiment techniques may automatically detect the likely existence of unwanted tracking based on heuristics and automatically perform one or more corrective actions based on the particular type of unwanted tracking that is detected.

Figure 1:
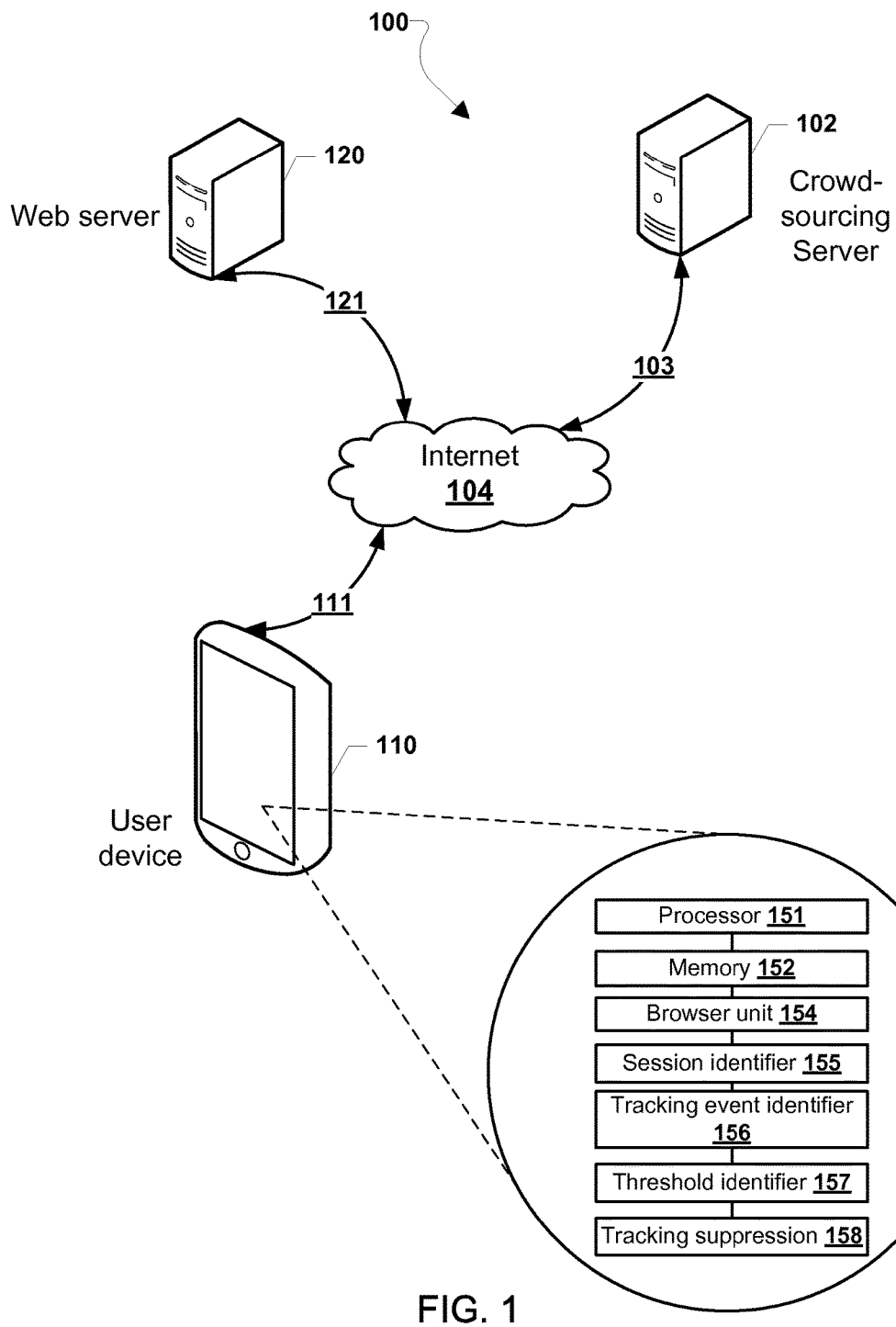
FIG. 1 is a component block diagram that illustrates an exemplary communication system that may include at least a user computing device and a web server suitable for some embodiments.

FIG. 1 illustrates an exemplary communication system 100 suitable for some embodiments that may include at least a user computing device 110 and a web server 120. Each computing device 110, 120 may utilize a respective wired or wireless connection 111, 121 to the Internet 104. For example, the user computing device 110 may utilize a wired connection (e.g., Ethernet) or wireless connection (e.g., Wi-Fi®) to an access point for exchanging data with remote devices via the Internet 104. The user computing device 110 may be any computing device configured to exchange communications over the Internet 104. The user computing device 110 may execute various applications, including a browser application (or "browser") suitable for receiving, processing, and rendering web content, such as HTML web pages, scripts (e.g., Javascript® scripts), etc. For example, the user computing device 110 may be a smartphone mobile device configured with a cellular network transceiver and a processor for executing one or more browsers.

The web server 120 may be a typical server computing device configured to administer access to data associated with one or more websites. For example, the web server 120 may handle requests from the user computing device 110 to download data for a webpage of a particular website or domain, such as by transmitting media, HTML code, scripts, and/or other data for rendering and/or execution at the user computing device 110. In particular, the web server 120 may be configured to transmit tracking items that may be stored on the user computing device 110 (e.g., HTML cookies, etc.) and/or functional data (e.g., scripts, binaries, etc.) that may be executed by the user computing device to perform various operations related to a website. For example, the user computing device may be triggered to run the functional data as a script that locates information stored within local cache (e.g., browser cache) of the user computing device.

In some embodiments, the communication system 100 may also include a crowd-sourcing server 102 configured to aggregate data received over a wired or wireless connection 103 to the Internet 104. A plurality of user computing devices, including the user computing device 110, may be configured to exchange data with the crowd-sourcing server 102, such as by providing data sets for aggregation by the crowd-sourcing server 102 and receiving aggregated or otherwise combined data from the crowd-sourcing server 102. In some embodiments, the plurality of user computing devices may be registered with a service supported by the crowd-sourcing server 102, such as a service that periodically pushes updated defense list data to all subscribing user computing devices. For example, the crowd-sourcing server 102 may be configured to transmit newly aggregated data sets to the user computing device 110 every hour/day/week, etc. In some embodiments, the user computing device 110 may be configured to transmit reports to the crowd-sourcing server 102 that indicate unwanted tracking information experienced at the user computing device 110. The crowd-sourcing server 102 may in turn be configured to combine such received reports with data received from other user computing devices to generate "defense lists" that indicate predefined browsing execution conditions that may be associated with unwanted tracking as well as corrective actions that may be performed to manage such unwanted tracking.

In some embodiments, the user computing device 110 may include various components configured to enable the user computing device 110 to perform the operations of the various embodiment methods. For example, the user computing device 110 may include one or more processors 151, one or more memory units 152, a browser module 154 (e.g., software, logic, instructions for executing applications or services for requesting, processing, and rendering data related to Internet-accessible sources, etc.), and a session boundary identifier module 155 configured to identify the beginning and end of website sessions as well as actions performed and/or data exchanged during such sessions. The user computing device 110 may also include a tracking event identifier module 156 configured to identify predetermined browsing execution conditions that may be associated with potentially unwanted tracking scenarios, such as by maintaining a counter corresponding to the number of HTML cookies, data accesses, script executions, etc. encountered during a session. The user computing device 110 may also include a threshold identifier module 157 configured to determine whether identified predetermined browsing execution conditions exceed various thresholds that indicate unwanted tracking, such as by determining whether the counter(s) of the tracking event identifier module 156 are indicative of unwanted tracking.

The user computing device 110 may further include a tracking suppression module 158 configured to perform various corrective actions to mitigate unwanted tracking conditions at the user computing device. For example, the tracking suppression module 158 may be configured for deleting stored data, obfuscating outgoing data to the web server 120, blocking access to local browser cache data from requesting scripts or logic associated with a website, communicating data associated with at least one of the actions to a report collecting unit, requesting data associated with at least one of the actions, generating a message for the user, generating a configuration file, and/or terminating a browsing session. In some embodiments, the configuration file may include a policy with thresholds associated with various unwanted tracking data, and data matching blacklists and whitelists corresponding to undesirable and desirable websites and service providers. In various embodiments, the browser module 154, session boundary identifier module 155, tracking event identifier module 156, threshold identifier module 157, and tracking suppression module 158 may be implemented as software modules executing within a processor 151 and/or as a dedicated hardware circuits, such as in a system on chip (SOC).

Figure 2:
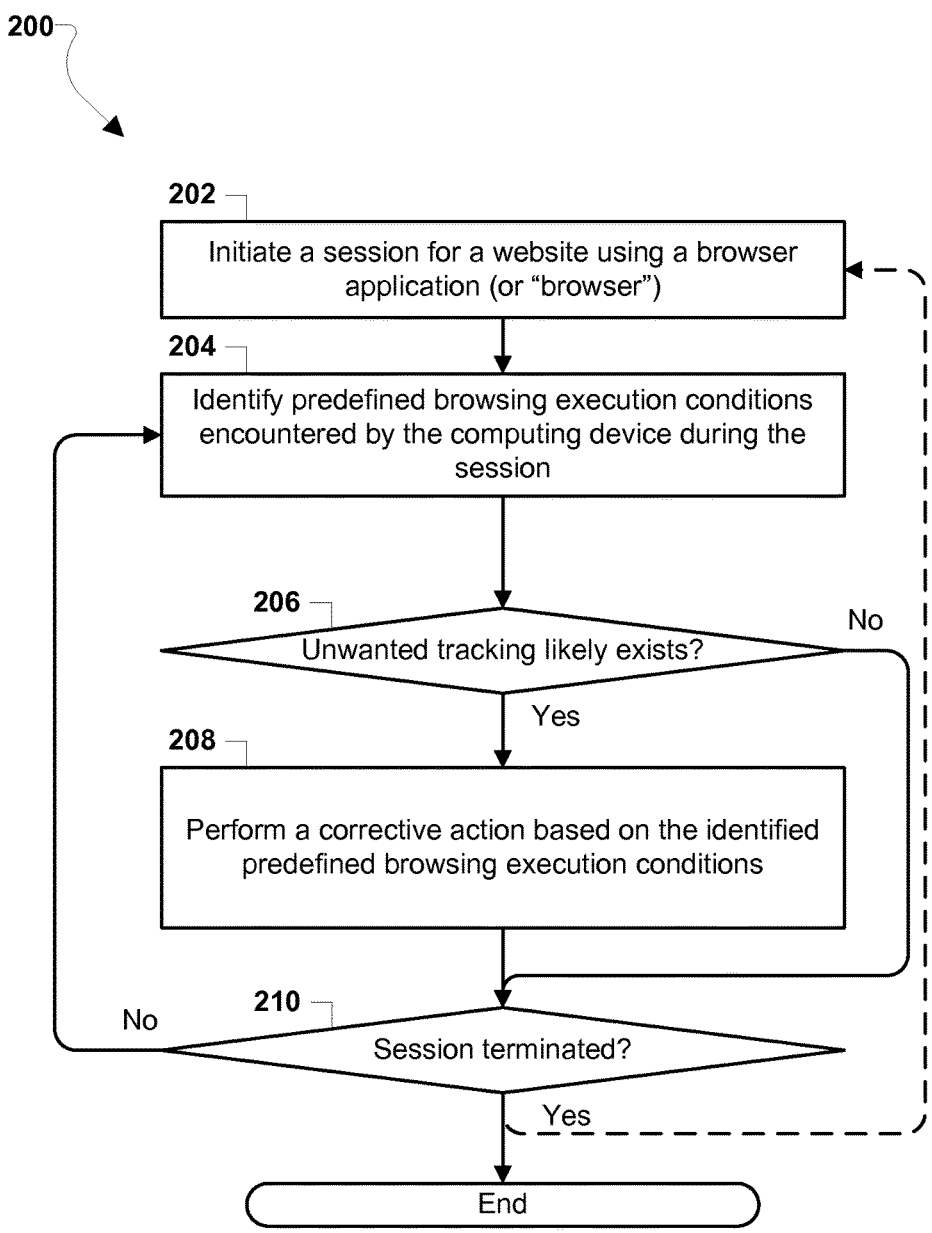
FIG. 2 is a process flow diagram that illustrates an embodiment method for a user computing device to manage website tracking.

FIG. 2 illustrates an embodiment method 200 for a user computing device to manage website tracking using a simplified "heuristic technique" as referenced above. The method 200 may be performed by various types of computing devices, such as the user computing device 110 (e.g., smartphone) configured with a processor 151 as described with reference to FIG. 1.

In block 202, the processor of the user computing device may initiate a session for a website using a browser application (or "browser"). Such a session may be a browsing period occurring between "insulating" events that stop browser state information from being carried automatically by the browser application. More generally, a session may correspond to a series of web actions insulated on both ends by web actions that may disable the carrying of a browser tracking state. In other words, the session may correspond to a time period that is between the occurrences of the insulating web actions. For example, a session may occur in between a user clicking on two bookmarks to retrieve data from different domains/web servers, performing two searches, or clicking one bookmark and performing one search.

During the session, the user computing device may tag, mark, or otherwise keep track of actions performed and/or tracking items stored. For example, the user computing device may mark stored tracking items with session identifiers (IDs) or other data that the processor 151 may use to determine whether the saved data relates to a particular session with a website. In some embodiments, the user computing device may maintain a data table that includes data records for various stored data or encountered events (e.g., tracking items, executions, cache accesses, etc.) for each session of the browser. For example, the user computing device may maintain a listing of identifiers for each HTML cookie, descriptive data of various types, and/or various forms of redirects encountered during a series of one or more sessions with a particular website. In some embodiments, the user computing device may store copies of session data within folders or other storage locations associated with the session (e.g., in "archive" data storage).

In block 204, the processor of the user computing device may identify predefined browsing execution conditions encountered by the user computing device during the session for the website. The user computing device may continually evaluate the activities of the browser application during the session to identify predefined browsing execution conditions that are known to be relevant to unwanted tracking, such as by assessing the data stored and/or accessed while interacting with the website. For example, as the occurrence of 401 redirects may be often evidence of unwanted tracking, the user computing device may continually evaluate user agent data transmitted by the browser application to identify whether a 401 redirect has occurred. As another example, the user computing device may continually determine whether obvious tracking items, such as HTML cookies, have been stored to browser storage during a session. Examples of the predefined browsing execution conditions encountered by the user computing device during the session may include the presence of stored data that includes at least one of an HTML cookie, a script, marker data, an executable code, or any combination thereof, and/or the occurrence of at least one of a suspect redirect (e.g., a 401 redirect, an Iframe redirect, special meta tags within HTML source (e.g., meta refresh), an HTTP redirect, a 301 moved permanently redirect, a 302 "Found" redirect, a 307 "Temporary" redirect, a Javascript® redirect, an htaccess redirect, a Frameset redirect, etc.), storage of an element in the browser cache, an attempt to access an element in the browser cache, and/or access to the canvas storage area and the execution of a script that attempts to modify the state of the browser.

In determination block 206, the processor of the user computing device may determine whether any unwanted tracking likely exists based on the identified predefined browsing execution conditions. In particular, the user computing device may compare one or more threshold values to the number of each identified predefined browsing execution condition (e.g., HTML cookie, etc.) encountered during the session. For example, the user computing device may determine that a single instance of a 401 redirect during the session indicates that unwanted tracking likely exists. In some embodiments, the user computing device may utilize various thresholds for the determination, such as a first threshold related to suspect redirects (e.g., a 401 redirect, htaccess redirect, etc.) and a second threshold for HTML cookies.

In some embodiments, the processor of the user computing device may determine a probability of whether any unwanted tracking are taking place in determination block 206 based on a scoring function and the identified predefined browsing execution conditions. For example, the user computing device may compare a combined score calculated by counting the number of different predefined browsing execution conditions to a predefined threshold. The predefined threshold may represent an amount of conditions that may indicate an unwanted tracking is likely to exist. In some embodiments, the computing device may adjust a score and may compare the adjusted score to predefined thresholds for every identified condition during the session (e.g., particular types of data stored in browser storage, etc.). If the score exceeds one of the predefined thresholds, the computing device may determine that unwanted tracking is likely.

In general, the computing device may calculate a higher score with more obvious conditions or greater numbers of stored elements during the session. Such conditions may relate to the number of suspect redirects (e.g., 401 redirects, an Iframe redirect, special meta tags within HTML source, meta refresh, an HTTP redirect, a 301 moved permanently redirect, a 302 "Found" redirect, a 307 "Temporary" redirect, a Javascript® redirect, an htaccess redirect, a Frameset redirect, etc.) experienced during a session, the number of HTML cookies stored in browser cache during the session, a HTML file cached during the session, and a script (e.g., a Javascript®) cached during the session.

In some embodiments, the computing device may calculate a plurality of scores in determination block 206, such as one for each type of condition, and each of the plurality of scores may be compared to a corresponding threshold. For example, the computing device may determine a probability of unwanted tracking in determination block 206 based on a number of 401 redirects and/or stored HTML cookies during a session. In some embodiments, the score and/or the threshold(s) may be influenced by user selections, such as by user overrides that increase or decrease the threshold associated with suspect redirects (e.g., 401 redirects, etc.).

In response to determining that the unwanted tracking of the computing device likely exists based on the identified predefined browsing execution conditions (i.e., determination block 206="Yes"), the processor of the user computing device may perform one or more corrective actions based on the predefined browsing execution conditions that are identified in block 208. Example corrective actions are described throughout this disclosure, for example with reference to FIG. 6. For example, the user computing device may delete stored tracking items, "fuzz" response data to a web server, and/or block read/write operations to browser cache or other local storage during or in relation to the session.

In response to determining that the unwanted tracking of the computing device does not likely exist based on the predefined browsing execution conditions that are identified (i.e., determination block 206="No"), or in response to performing the corrective action in block 208, the processor of the user computing device may determine whether the session with the website has terminated in determination block 210. For example, the user computing device may determine whether the user has entered a new URL or domain name in the browser application address bar or closed the browser application.

In response to determining that the session with the website has not terminated (i.e., determination block 210="No"), the user computing device may continue identifying predefined browsing execution conditions encountered during the session for the website in block 204. In response to determining that the session with the website has terminated (i.e., determination block 210="Yes"), the processor may end the method 200 or optionally repeat the method 200 with a new session initiation in block 202.

Figure 3:
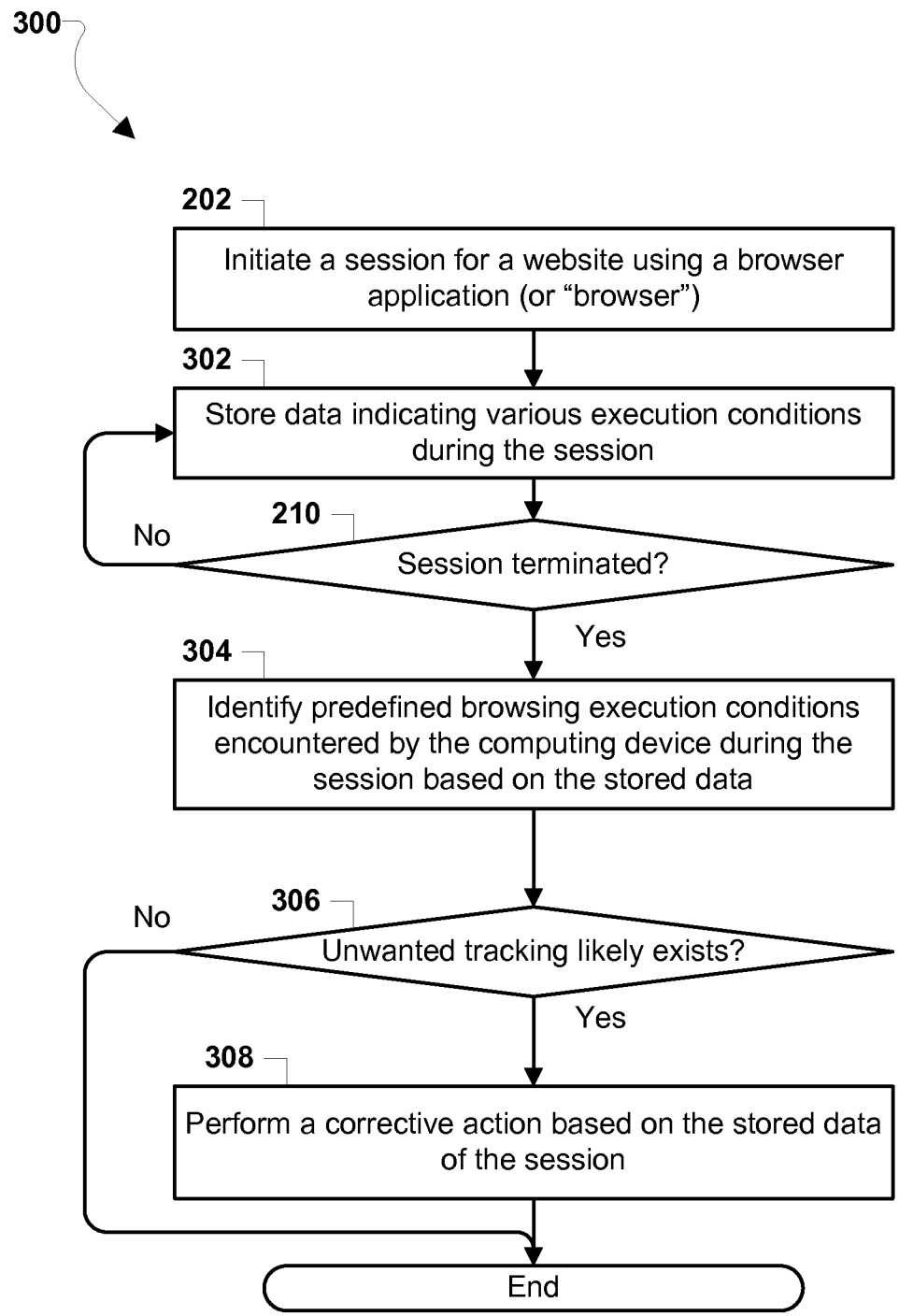
FIG. 3 is a process flow diagram that illustrates an embodiment method for a user computing device to manage website tracking after a session with a website has completed

FIG. 3 illustrates an embodiment method 300 for a user computing device to manage website tracking after a session with a website has completed. The method 300 is similar to the method 200 described above with reference to FIG. 2, except that the method 300 includes operations for evaluating session data and potentially performing corrective actions after a website session has concluded. In other words, unwanted tracking may not necessarily need to be remedied during an initial session with an offending website, as privacy may not be immediately affected the moment a user stops visiting the website for the first time. Instead, as privacy may be impaired on subsequent sessions with the website that allow the website operators to identify returning visitors, the user computing device may perform remediation operations prior to further encounters with the offending website. Thus, unlike virus detection or other immediate security countermeasures, tracking analysis and corrective actions may be scheduled to occur at a more convenient time after data is collected during the session. In some embodiments, the user computing device may schedule the performance of some operations of the method 300 after a session concludes and during times when the user computing device has beneficial operating conditions, such as with access to Wi-Fi® local area network (LAN) and/or a sufficient remaining battery life.

The operations of blocks 202, 210 may be similar to the operations of like numbered blocks described above with reference to FIG. 2. In block 302, the processor of the user computing device may store data indicating various execution conditions during the session. For example, the user computing device may store within a data table (or database) descriptions and/or data associated with actions encountered or performed during the session, such as read(s)/write(s) of local storage or cache or encountered redirects.

In block 304, the processor of the user computing device may identify predefined browsing execution conditions encountered during the session by the computing device based on the stored data. The operations of block 304 may be similar to those described with reference to block 204 of FIG. 2, except that the operations of block 304 may be performed using the stored data after the session has terminated instead of during the session.

In determination block 306, the processor of the user computing device may determine whether any unwanted tracking likely exists based on the predefined browsing execution conditions identified using the stored data. The operations of determination block 306 may be similar to those of determination block 206 as described above, except the operations of determination block 306 may be based on the identifications made by the user computing device after the session is terminated. For example, the determinations may be made at any suitable time frequency (e.g., once a day/week/month), when the user computing device is plugged into a wall outlet, when the user computing device's available battery power is above a certain threshold, and/or otherwise is available to freely expend resources.

In response to determining that the unwanted tracking of the computing device likely exists based on the predefined browsing execution conditions identified based on the stored data (i.e., determination block 306="Yes"), the processor of the user computing device may perform one or more corrective actions based on the predefined browsing execution conditions in block 308. The operations of block 308 may be similar to those of block 208 as described above, except the operations of block 308 may be based on the identifications made by the user computing device after the session is terminated using the stored data obtained during the session.

In response to determining that the unwanted tracking of the computing device are unlikely to exist based on the predefined browsing execution conditions identified based on the stored data (i.e., determination block 306="No"), or in response to performing the operations of block 308, the user computing device may end the method 300.

Figure 4:
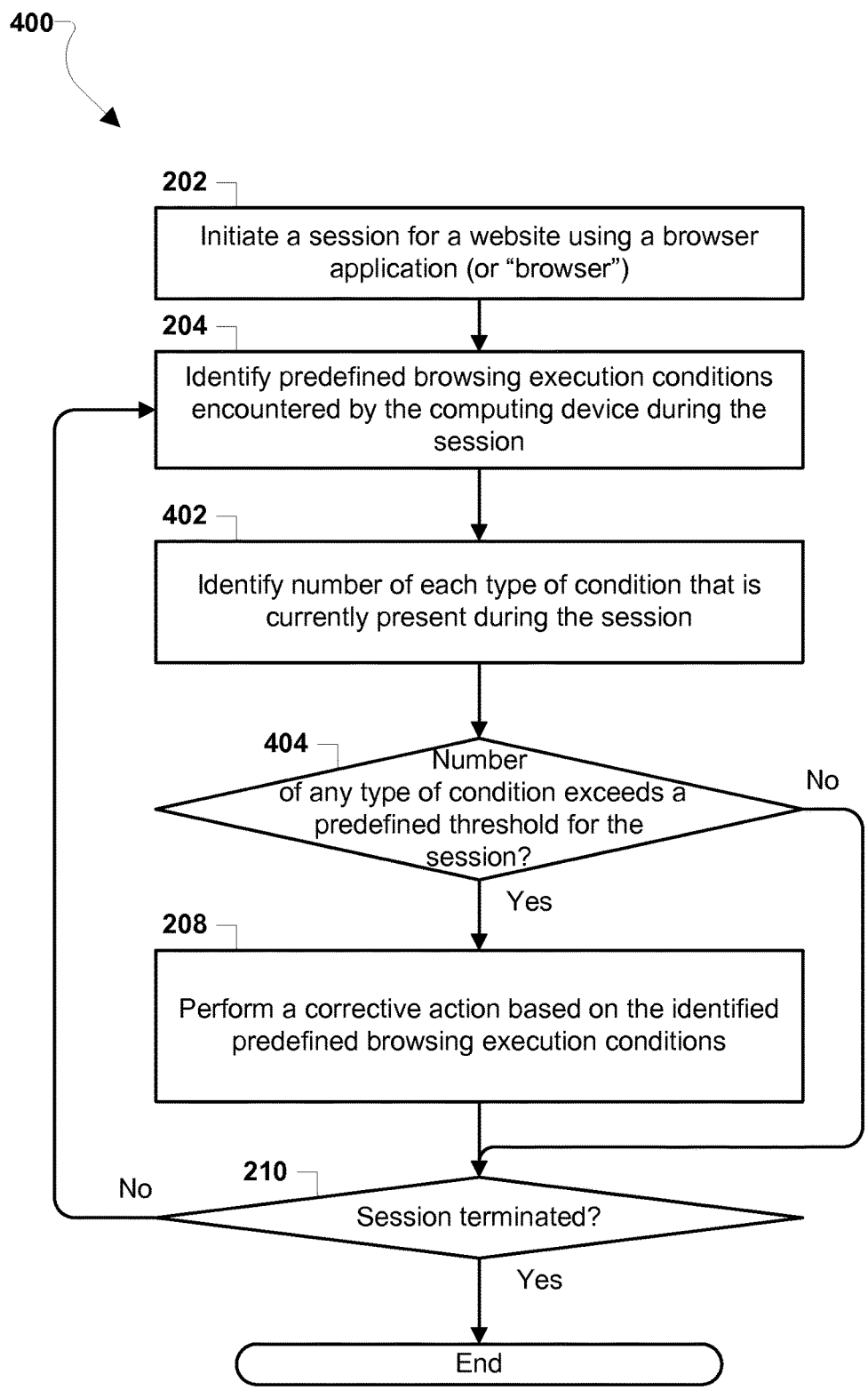
FIG. 4 is a process flow diagram that illustrates an embodiment method for a user computing device to manage website tracking by identifying tracking conditions that exceed predefined thresholds associated with unwanted tracking.

FIG. 4 illustrates an embodiment method 400 for a user computing device to manage website tracking by identifying tracking conditions that exceed predefined thresholds associated with unwanted tracking. The method 400 may be similar to the method 200 described above with reference to FIG. 2, except that the method 400 includes operations for determining whether the amount of experienced tracking conditions exceeds tolerances in order to determine whether unwanted tracking is likely occurring at a given time. For example, the user computing device may identify a type of condition (e.g., HTML cookie stored, script executed, etc.) for a plurality of identified predefined browsing execution conditions, and determine whether the number of each type of condition occurring in the session exceeds a predefined threshold for each type of condition for the session.

The operations of blocks 202-204, 208-210 may be similar to the operations of like numbered blocks described above with reference to FIG. 2. In block 402, the processor of the user computing device may identify a number of each type of predefined browsing execution condition that is currently present during the session. For example, the user computing device may tally the number of HTML cookies that have been stored to local storage of the user computing device since the beginning of the session with the website. Such tallying may be performed using a database query, such as a query of a data table including data records for each predefined browsing execution condition encountered during the session (or all sessions within a time period).

In determination block 404, the processor of the user computing device may determine whether the number of any type of predefined browsing execution condition exceeds a predefined threshold for the session. For example, the user computing device may compare the number of HTML cookies stored during the session to a predefined threshold known to indicate that unwanted tracking via HTML cookies (e.g., five HTML cookies, etc.) is likely. In some embodiments, the threshold for particular types of predefined browsing execution conditions may be only a single occurrence of that condition, such as a redirect that is well-known to be associated with unwanted tracking operation by website operators.

In response to determining that the identified number of a type of predefined browsing execution condition does not exceed the predefined threshold for that type for the session (i.e., determination block 404="No"), the user computing device may continue with the determination operations in determination block 210. In response to determining that the identified number of a type of predefined browsing execution condition exceeds the predefined threshold for that type for the session (i.e., determination block 404="Yes"), the user computing device may perform a corrective action in block 208 as described above.

Figure 5:
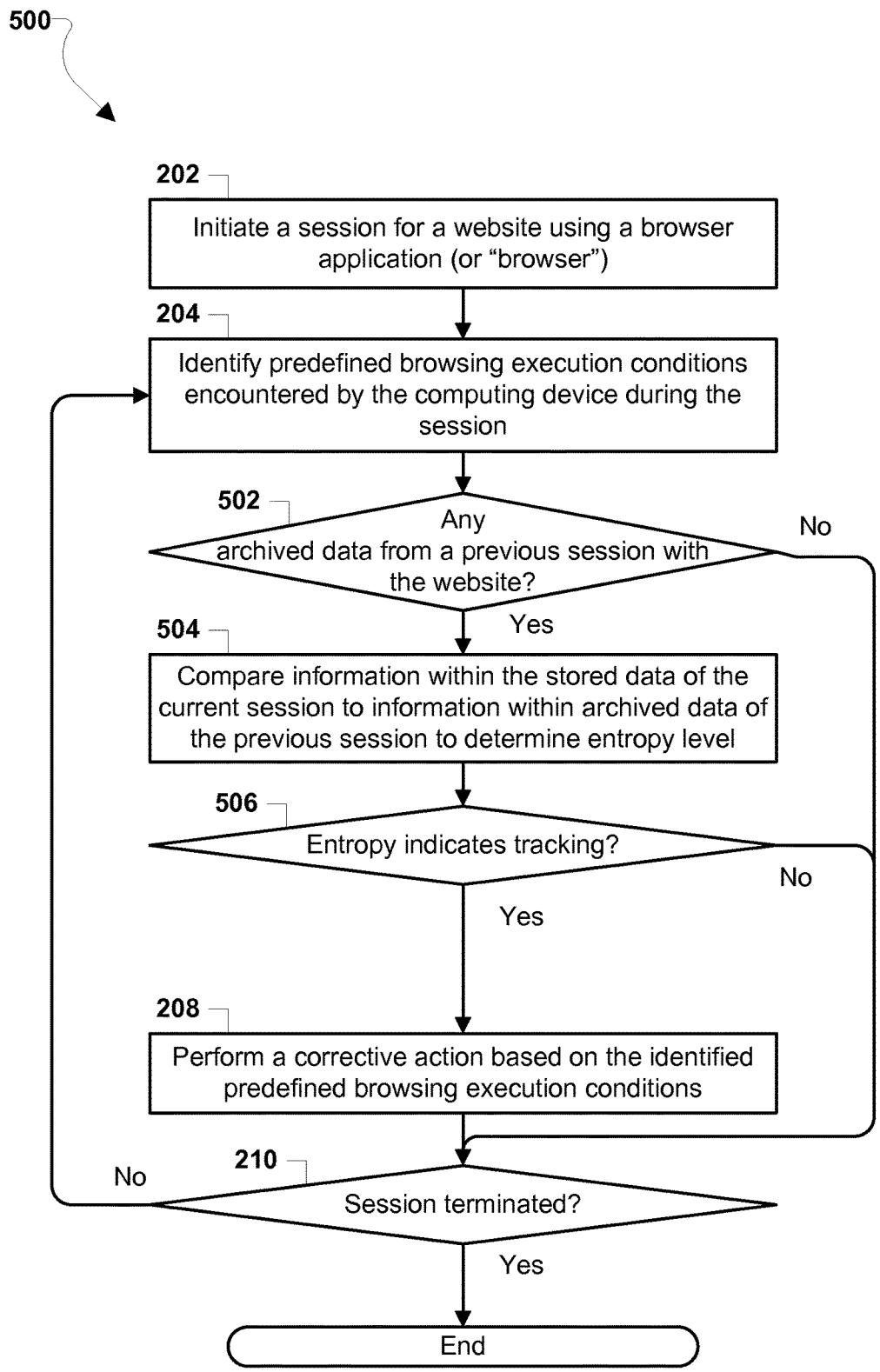
FIG. 5 is a process flow diagram that illustrates an embodiment method for a user computing device to manage website tracking by identifying entropy between archived tracking items and subsequent tracking items.

FIG. 5 illustrates an embodiment method 500 for a user computing device to manage website tracking by comparing the entropy of archived tracking items to the entropy of subsequent tracking items. The method 500 may be similar to the method 200 described above with reference to FIG. 2, except that the method 500 includes operations for determining whether recent data stored due to a current session with a website is different from previously stored data from an earlier session with the same website. For example, the user computing device may determine whether previously-stored HTML cookie data matches HTML cookie data from the current session. Differences (or entropy) between stored and subsequent cookie data may indicate an attempt by the operators of the website to perform unwanted tracking. To accomplish such comparisons, the user computing device may be configured to archive tracking items encountered during a session with a website in temporary storage separate from browser cache. By relocating but not erasing initial tracking items, the user computing device preserves the data while also enabling the website to place new initial tracking items for analysis. When old and new tracking items are the same (i.e., no entropy detected), the tracking items may typically be considered safe and thus may be allowed to remain undisturbed by the user computing device.

The operations of blocks 202-204, 208-210 may be similar to the operations of like numbered blocks described above with reference to FIG. 2. After initiating a current session with the website, the processor of the user computing device may determine whether there is any archived data from a previous session with the website in determination block 502. In general, the user computing device may perform operations (e.g., look-ups) to identify archived data of a previous session that may be compared to information within stored data of the current session when determining whether unwanted tracking of the computing device likely exists. For example, the user computing device may perform a look-up in a data table (or database) with reference to the website of the current session to determine whether there have been any previous sessions with the website via the browser application that resulted in stored data of predefined browsing execution conditions. As another example, the user computing device may evaluate timestamps of previously-stored data associated with the website to determine whether the data is associated with the current session. Such operations may be performed for each individual type of predefined browsing execution condition encountered during the current session. For example, the user computing device may not perform a search for previously-stored data on 401 redirects associated with the website when only HTML cookies have been encountered during the current session.

In response to determining that there is no archived data from a previous session with the website (i.e., determination block 502="No"), the user computing device (e.g., a processor of the user computing device) may determine whether the session has terminated in determination block 210 and proceed as described above with reference to FIG. 2.

In response to determining that there is archived data from a previous session with the website (i.e., determination block 502="Yes"), the processor of the user computing device may compare information within the stored data of the current session to information within the archived data of the previous session to determine an entropy level in block 504. In other words, the user computing device may compare the old and new data associated with the website to determine whether there are changes to the conditions that may indicate unwanted tracking by the website operators. An example of changes in stored website data that may indicate unwanted tracking may be a change in the links to documents or sources between a previous visit to the website and the current visit to the website. For example, the user computing device may compare information within stored data of a current session of a website to information within archived data of a previous session of the website to identify one or more differences (i.e., entropy). If there are one or more differences, the user computing device may determine whether at least a first link within the stored data of the session resolves to a first document or source that differs from a second document or source that resolves from a second link within the archived data of a previous session. If there are differences in the documents or sources resolving from links in the stored data of two different sessions of the website, the user computing device may determine that unwanted tracking of the computing device likely exists. In general, a high entropy level may be determined when the archived data and the current predefined browsing execution conditions are more dissimilar, as greater differences may indicate that unwanted tracking is more likely to have occurred. For example, when the archived and current data match, there may be a low or non-existent entropy level. Alternatively, when the archived and current data include many differences, there may be a high entropy level.

To determine entropy levels, the user computing device may evaluate the contents of the archived and current data. For example, the user computing device may perform text analysis of the contents of a previous HTML cookie and a subsequently-received HTML cookie from the website to identify whether the text within each is similar. The user computing device may also determine whether URLs associated with the predefined browsing execution conditions are the same over time. For example, the user computing device may compare the target URL for a previous redirect experienced via the website with the current URL the website directed the browser application to in the current session. The user computing device may perform various analytical operations to perform the comparisons, such as typical pattern or text matching routines for file contents, file size comparisons, filename text comparisons, and comparisons of binaries using hex editor functionalities.

In some embodiments, the user computing device may determine entropy levels for each type of predefined browsing execution condition existing in the archived data and the current session data, such as an entropy level for HTML cookies and/or another entropy level for redirects. In such cases, the entropy level for different types of predefined browsing execution conditions may be determined differently. For example, the user computing device may determine a high entropy level for HTML cookies based on slight differences in the archived and current data, but may determine a low entropy level for slight difference in the archived and current data related to redirects.

In some embodiments, the determined entropy level may be a percentage, such as a percent of the probability that differences in the archived and current data indicate unwanted tracking, or via a discrete or binary label, such as "same" or "different". For example, based on the user computing device determining that the archived and current data are exact matches (e.g., contain exactly the same data, reference the exact same URL, etc.), the user computing device may determine that there is "no entropy" between the archived and current data. As another example, the user computing device may determine that the entropy level related to redirect-type predefined browsing execution conditions may be a floating point value that may be compared to a tolerance threshold.

In determination block 506, the processor of the user computing device may determine whether the entropy level determined based on the comparison between the archived data from the previous session and the current session indicates unwanted tracking. For example, the user computing device may compare the determined entropy level to a predefined entropy threshold. In some embodiments, the user computing device may utilize different thresholds for different types of the predefined browsing execution conditions. For example, the threshold for HTML cookie entropy level may be configured such that any entropy level that is not zero indicates unwanted tracking.

In response to determining that the entropy level indicates that unwanted tracking is likely (i.e., determination block 506="Yes"), the user computing device may perform one or more corrective actions based on the identified predefined browsing execution conditions in block 208 as described above with reference to FIG. 2. In response to determining that the entropy level indicates that unwanted tracking is unlikely (i.e., determination block 506="No"), the user computing device may continue with the operations in determination block 210 as described above with reference to FIG. 2.

In some embodiments, if an identified entropy level (or entropy score) computed by the user computing device does not exceed a threshold for tracking that is likely unwanted, the user computing device may be configured to synch or otherwise exchange information with a crowd-sourcing server. For example, the user computing device may transmit any calculated scores, related thresholds, and/or data describing encountered predefined browsing execution conditions to a server configured to aggregate and analyze tracking conditions of subscribing devices. Such synching may be done at the end of a session and/or at some future time, such as when the user computing device is determined to be plugged into a power outlet and/or at a predefined time of the day. The crowd-sourcing server may perform analysis operations to determine whether unwanted tracking is likely and notify the user computing device whether tracking items of the session should be handling accordingly (e.g., erased). The crowd-sourcing server may receive many submissions by devices indicating encountered predefined browsing execution conditions, and may determine an entropy assessment for each type of condition for each device.

In some embodiments, the user computing device may place the website on a "blacklist" when the tracking items have a sufficiently-high entropy level. For example, the user computing device may blacklist the website when certain conditions are met (e.g., archived and new tracking items are of a particular type, the tracking mechanism has a typically high propensity for use as a tracker, and/or the archived and new tracking items are sufficiently different). In some embodiments, the user computing device may report such blacklisting and/or the entropy calculations to a remote device, such as a crowd-sourcing server or another server configured to maintain simple blacklisting data. In some embodiments, such a remote device may utilize extensive operations to probe web resources of the website in order to save time and resources of the user computing device to thoroughly determine the entropy of the tracking items.

Figure 6:
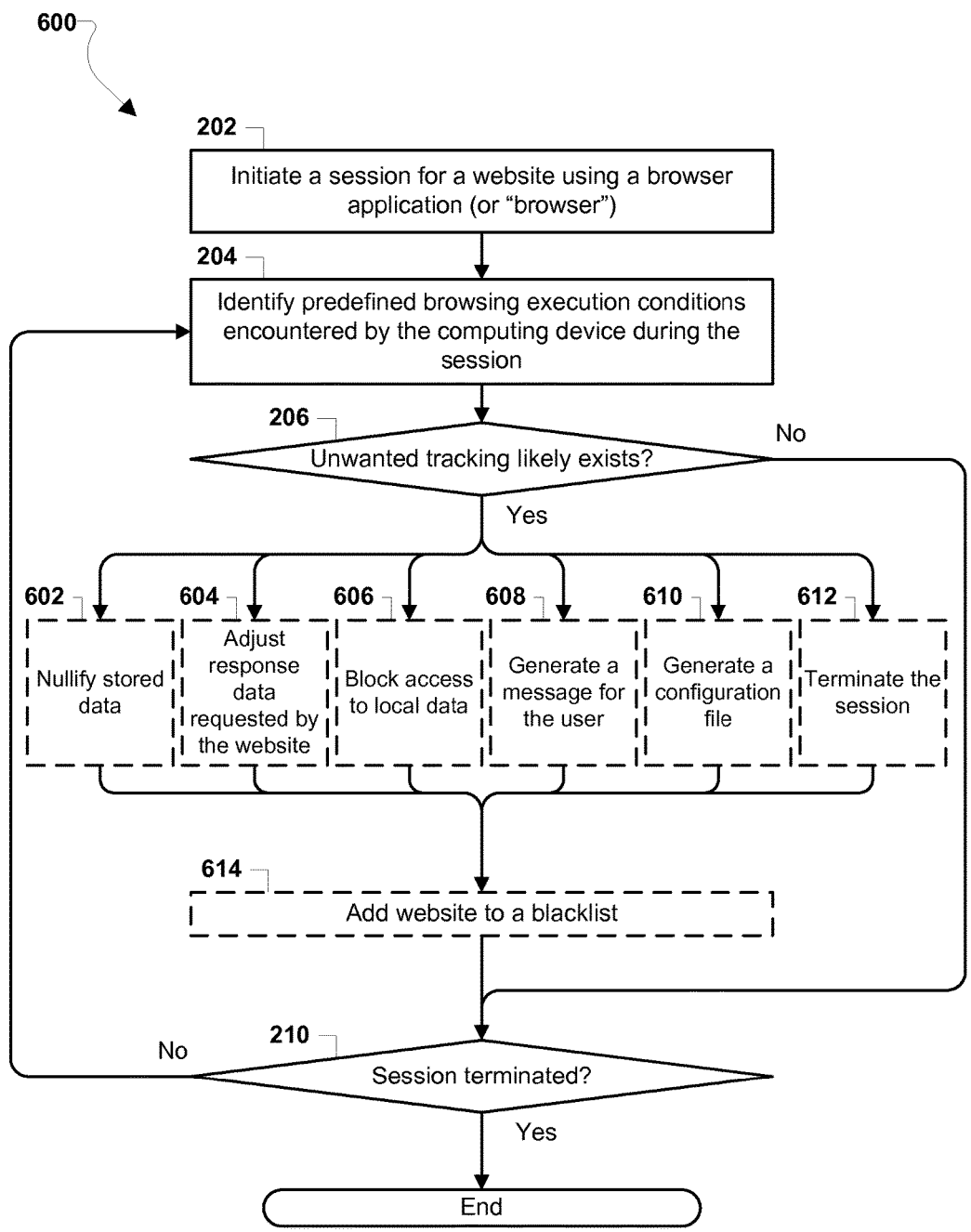
FIG. 6 is a process flow diagram that illustrates an embodiment method for a user computing device to perform various corrective actions in order to remedy unwanted tracking.

FIG. 6 illustrates an embodiment method 600 for a user computing device to perform various corrective actions in order to remedy unwanted tracking. The method 600 may be similar to the method 200 described above with reference to FIG. 2, except that the method 600 includes examples of operations for correcting unwanted tracking when it is determined that unwanted tracking is likely occurring or likely to occur in the future. For example, in response to determining that an entropy level related to HTML cookies exceeds a predefined entropy threshold, the user computing device may delete the HTML cookies to avoid potential unwanted tracking in the future.

The operations of blocks 202-206, 210 may be similar to the operations of like numbered blocks described above with reference to FIG. 2. In response to determining that unwanted tracking is likely based on the identified predefined browsing execution conditions (i.e., determination block 206="Yes"), the processor of the user computing device may select one or more corrective actions from a plurality of predefined actions based on the identified predefined browsing execution conditions, and perform the selected one or more corrective actions. The following are exemplary operations that may be selected based on the predefined browsing execution conditions.

In optional block 602, the processor of the user computing device may nullify data stored due to the predefined browsing execution conditions. For example, the user computing device may delete, modify, and/or relocate the stored data from memory in order to provide countermeasures for unwanted tracking efforts that may read or write to the stored data in subsequent visits to the website.

In optional block 604, the processor of the user computing device may adjust response data requested by the website. For example, upon initialization of a session with the website, a web server associated with the website may transmit request messages to the user computing device asking for particular information, such as specifications or version information regarding an operating system, browser, and/or other system. In response to such requests, the user computing device may "fuzz" or otherwise change data in order to provide a response that obscures, inaccurately answers, and/or incompletely answers the request. For example, to adjust the response data, the user computing device may randomize the response data, omit a portion of information requested by the website, provide inaccurate or imprecise information within the response data, or any combination thereof.

In some embodiments, "fuzzed" data may include enough accurate information to permit the requesting website to send data suitable for rendering and use at the user computing device, but not accurate enough to enable the website to conduct fingerprinting of the user computing device. In other words, the user computing device may provide some answers in order to continue with the communications for downloading or otherwise accessing the website, but may not provide data that may enable the operator of the website to track the user computing device. In some embodiments, the response data may be in the form of user agent data, such as user agent data that identifies a device manufacturer, build, WebKit version, and/or other information related to a browser application. Such user agent data may be adjusted as website operators may use such data to infer user computing device or user characteristics.

In optional block 606, the processor of the user computing device may block access to local data, such as data stored within a browser cache. For example, the user computing device may prevent tracking elements of the session (e.g., Javascript®, executables, etc.) from reading or writing to a local buffer on the computing device.

In optional block 608, the processor of the user computing device may generate a message for the user, such as by rendering a warning or prompt that indicates unwanted tracking is likely occurring.

In optional block 610, the processor of the user computing device may generate a configuration file, such as a file that may be used by the browser to change its security settings. Such configuration files may also be generated external to the processor of the user computing device, such as by a central authority or a trusted peer computing device.

In optional block 612, the processor of the user computing device may terminate the session.

In optional block 614, the processor of the user computing device may add the website (or a related URL) to a "blacklist" (i.e., perform operations to "blacklist" the website), such as storing the URL of the website in a compiled list of websites that are likely associated with unwanted tracking and thus should be protected against in subsequent visits.

In response to performing any of the one or more corrective actions of optional blocks 602-614, the user computing device may determine whether the session has terminated in determination block 210 and proceed as described above with reference to FIG. 2.

The embodiment techniques described above with reference to FIGS. 2-6 may be implemented as client-side functionalities of a user computing device that may not require any external feed of data to properly identify and mitigate tracking that is likely unwanted. However, other embodiments as illustrated in FIGS. 7-8 may include functionalities (or service components) that may utilize data from external sources or services to supplement such client-side functionalities.

Figure 7:
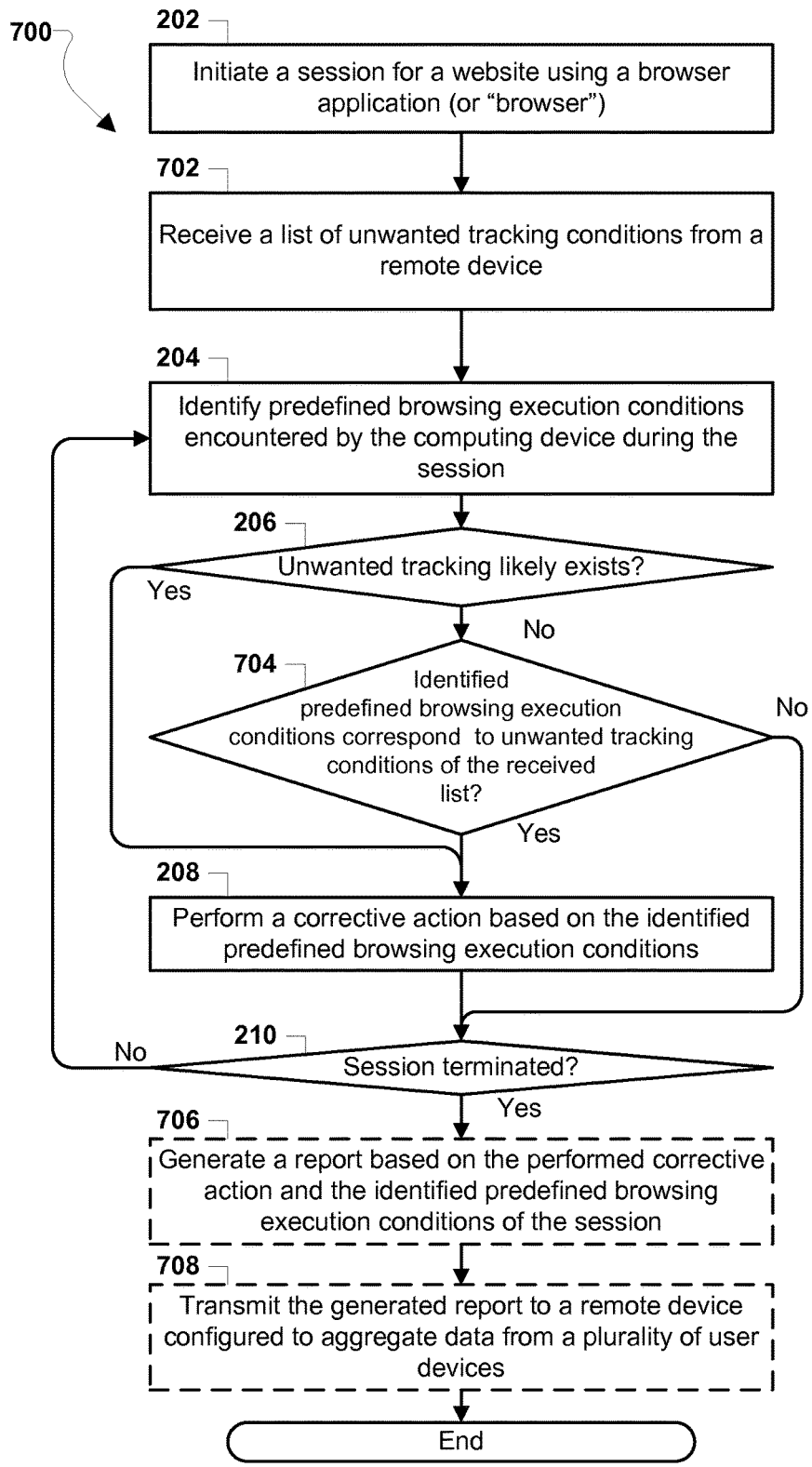
FIG. 7 is a process flow diagram that illustrates an embodiment method for a user computing device to manage website tracking by utilizing aggregated data from a crowd-sourcing server.
Figure 8:
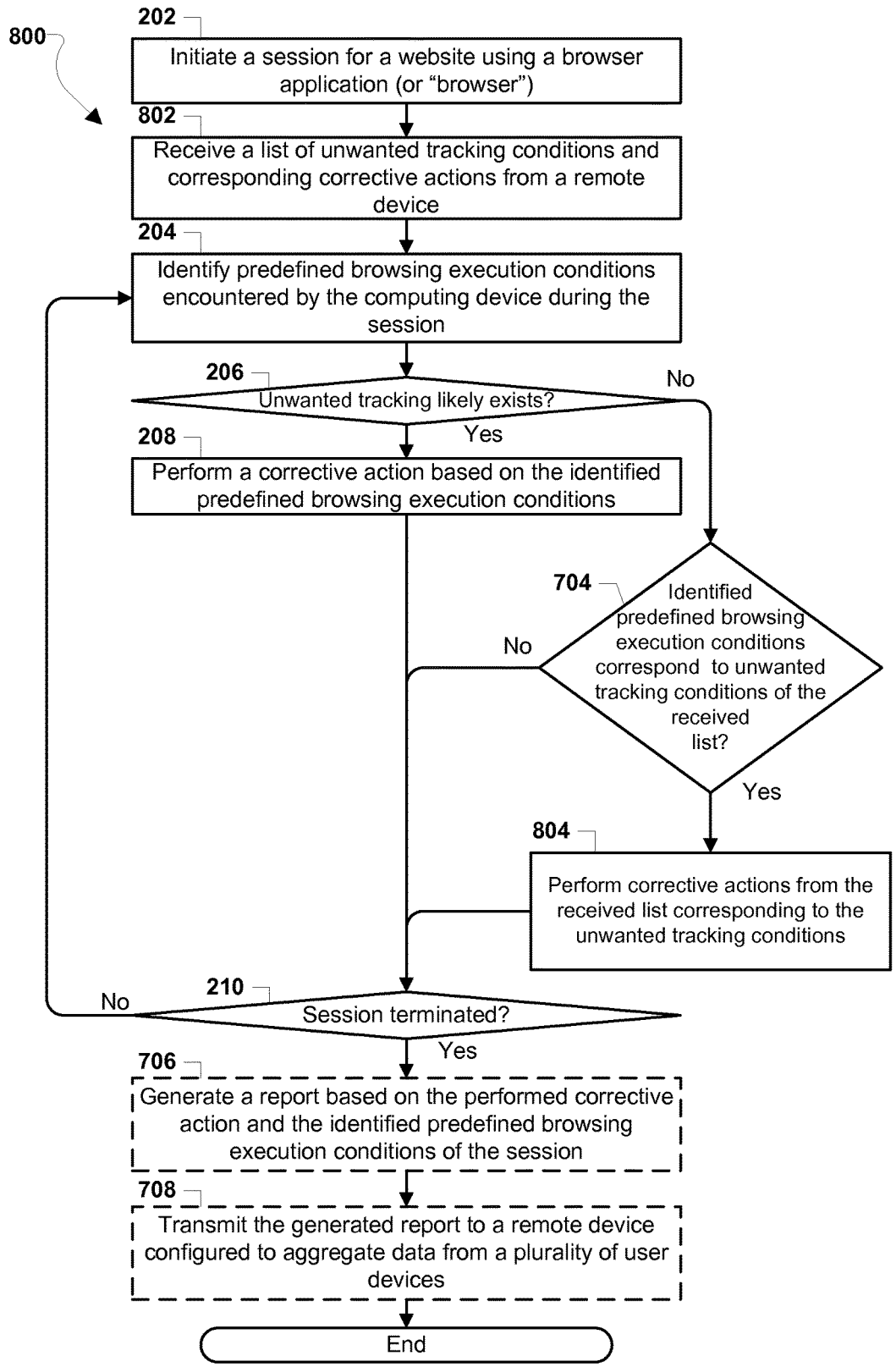
FIG. 8 is a process flow diagram that illustrates an embodiment method for a user computing device to manage website tracking by utilizing aggregated data from a crowd-sourcing server that indicates corrective actions associated with tracking conditions.

FIG. 7 illustrates an embodiment method 700 for a user computing device to manage website tracking by utilizing aggregated data from a crowd-sourcing server. The method 700 may be similar to the method 200 described above with reference to FIG. 2, except that the method 700 includes operations for receiving and using crowd-sourced data for identifying tracking that is likely unwanted, referred to as "defense lists." Such crowd-sourced data may be received from a crowd-sourcing server and may be associated with a service to which the user computing device is subscribed. The crowd-sourcing data may serve as a supplement to the heuristic techniques, such as described above with reference to FIGS. 2-6, allowing user computing devices to better counteract nefarious websites that may use insistent tactics that circumvent thresholds for identifying unwanted tracking as described above. The operations of blocks 202-210 may be similar to the operations of like numbered blocks described above with reference to FIG. 2.

In block 702, the processor of the user computing device may receive a list of unwanted tracking conditions from a remote device (i.e., a defense list). Such a defense list may include data that may instruct the user computing device about activities, tracking items, and other conditions that have been linked to unwanted tracking experienced by other devices. For example, on a regular period or in response to a request by the user computing device, the user computing device may receive aggregated data from a crowd-sourcing server configured to compile reports from various user computing devices regarding experiences with unwanted tracking. In some embodiments, the defense list may include data indicating thresholds for the number of certain types of stored data (e.g., cookies, etc.) for particular websites. For example, the defense list may indicate the number of social networking cookie files that are typical without unwanted tracking. In some embodiments, the received list may include corrective actions that may be performed by the user computing device in response to detecting any of the tracking conditions of the list.

In some embodiments, the crowd-sourcing server may be a service reachable by the Internet and may be associated with a security service provider or company, a carrier, or an OEM. In some embodiments, accessing or otherwise receiving information from the crowd-sourcing server may be based on the user of the user computing device subscribing for service (e.g., a tracking or privacy protection service for a monthly rate, such as $1.99/month, etc.).

In some embodiments, the user computing device may transmit data to a crowd-sourcing server that describes the encountered tracking conditions (or associated identifiers, digests or descriptions) along with contextual descriptions (e.g., context in which data was received) in order to cause the crowd-sourcing server to determine whether the conditions are associated with tracking. For example, based on such a transmission or report, the crowd-sourcing server may identify an entropy level of tracking items from several sessions or submissions. The crowd-sourcing server may transmit notifications in response, such as a message indicating unwanted tracking is not likely to exist or is likely to exist based on the reported data from the user computing device. In some embodiments, the user computing device may purge or delete the tracking items in response to receiving a notification from the crowd-sourcing server indicating that unwanted tracking is likely. In some embodiments, such a notification may cause the user computing device to add the website identity to a blacklist or white list for easily managing tracking associated with the website in the future.

In some embodiments, the received defense list may only relate to websites and/or services that are relevant to the user or the user computing device. For example, based on opt-in procedures and/or preferences supplied to the crowd-sourcing server, the user computing device may only receive a subset of all the aggregated data from all reports. Such relevant defense lists may include a certain number of the most likely offending tracking conditions or offending conditions based on the aggregated data. In some embodiments, the user computing device may only receive defense lists related to websites that the user computing device has frequented and/or that are in the user's primary language.

In some embodiments, the crowd-sourced data may be a simplified report that indicates the most likely encountered tracking conditions in order to save storage and processing on the user computing device. For example, the crowd-sourcing server may present only distilled defense lists that may be quickly reviewed by the user computing device.

Returning to FIG. 7, as described above, the user computing device may identify predefined browsing execution conditions in block 204 and determine whether the unwanted tracking is likely based on the identified browsing execution conditions in determination block 206.

In determination block 704, the processor of the user computing device may determine whether the identified predefined browsing execution conditions correspond to unwanted tracking conditions of the received list. For example, the user computing device may compare the number and type of HTML cookies associated with the website to a threshold included in the received defense list, where the threshold may or may not be different than a threshold pre-existing on the user computing device.

In response to determining that the identified predefined browsing execution conditions do not correspond to the unwanted tracking conditions of the received list (i.e., determination block 704="No"), the user computing device may continue with the operations in determination block 210 as described above.

In response to determining that the identified predefined browsing execution conditions correspond to the unwanted tracking conditions of the received list (i.e., determination block 704="Yes"), the user computing device may perform one or more corrective actions in block 208 as described above with reference to FIG. 2. In some embodiments, the operations of determination block 206 may be optional as the processor of the user computing device may identify the likely existence of unwanted tracking based only on the defense list and the identified predefined browsing execution conditions encountered by the computing device during the session.

In some embodiments, the user computing device may be configured to share data regarding the corrective actions performed based on identified predefined browsing execution conditions. For example, in response to determining that the session has terminated (i.e., determination block 210="Yes"), the processor of the user computing device may generate a report based on the performed corrective action and the identified predefined browsing execution conditions of the session in optional block 706.

In optional block 708, the processor of the user computing device may transmit the generated report to a remote device configured to aggregate data from a plurality of user computing devices, and end the method 700. In some embodiments, the user computing device may transmit the report data based on an "opt-in" preference set by the user of the user computing device. Such an opt-in may function as an incentive mechanism for participation in crowd-sourcing, as aggregated data from the crowd-sourcing server may or may not be provided to user computing devices that have not opted-in and shared data for aggregation.

FIG. 8 illustrates an embodiment method 800 for a user computing device to manage website tracking by utilizing aggregated data from a crowd-sourcing server that indicates corrective actions associated with tracking conditions. The method 800 may be similar to the methods described above with reference to FIGS. 2 and 7, except that the method 800 includes operations for receiving and using crowd-sourced data for identifying unwanted tracking and performing appropriate corrective actions.

The operations of blocks 202-210 may be similar to the operations of like numbered blocks described above with reference to FIG. 2. In block 802, the processor of the user computing device may receive a list of unwanted tracking conditions and corresponding corrective actions from a remote device. The operations of block 802 may be similar to those of block 702 described above with reference to FIG. 7, except that the received defense list in block 802 may include not only data that may be used to identify certain conditions that indicate tracking that is likely unwanted, but also data that may indicate how the user computing device may manage the unwanted tracking (e.g., perform operations as described above with reference to FIG. 6, etc.). The user computing device may perform the operations of blocks 204-206 as described above.

In response to determining that it is unlikely that unwanted tracking is occurring based on the identified predefined browsing execution conditions (i.e., determination block 206="No"), the processor of the user computing device may determine whether the identified predefined browsing execution conditions correspond to unwanted tracking conditions of the received list as described above with reference to determination block 704.

In response to determining that the identified predefined browsing execution conditions correspond to the unwanted tracking conditions of the received list (i.e., determination block 704="Yes"), the processor of the user computing device may perform corrective actions from the received list corresponding to the unwanted tracking conditions similar to those described above with reference to FIG. 6. For example, the corrective actions may include operations for the user computing device to delete data, modify stored data, and/or block access to certain aspects of local memory. The user computing device may determine whether the session has terminated in determination block 210 and proceed as described with reference to FIG. 2.

Various forms of computing devices, including mobile devices, personal computers, and laptop computers, may be used to implement the various embodiments. Such computing devices typically include the components illustrated in FIG. 9 which illustrates an example smartphone-type computing device 110. In various embodiments, the computing device 110 may include a processor 901 coupled to a touch screen controller 904 and an internal memory 902. The processor 901 may be one or more multicore ICs designated for general or specific processing tasks. The internal memory 902 may be volatile and/or non-volatile memory, and may also be secure and/or encrypted memory, or unsecure and/or unencrypted memory, or any combination thereof. Although internal memory 902 is shown to be separate from processor 901 in FIG. 9, persons skilled in the art will appreciate that the internal memory 902 or at least a portion of the internal memory 902 may be on-board processor 901.

The touch screen controller 904 and the processor 901 may also be coupled to a touch screen panel 912, such as a resistive-sensing touch screen, capacitive-sensing touch screen, infrared sensing touch screen, etc.

The computing device 110 may have one or more radio signal transceivers 908 (e.g., Bluetooth®, ZigBee®, Wi-Fi®, RF radio) and antennae 910, for sending and receiving, coupled to each other and/or to the processor 901. The transceivers 908 and antennae 910 may be used with the above-mentioned circuitry to implement the various wireless transmission protocol stacks and interfaces. The computing device 110 may include a cellular network wireless modem chip 916 that enables communication via a cellular network and is coupled to the processor.

The computing device 110 may include a peripheral device connection interface 918 coupled to the processor 901. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port (not shown).

The computing device 110 may also include speakers 914 for providing audio outputs. The computing device 110 may also include a housing 920, constructed of a plastic, metal, or a combination of materials, for containing all or some of the components discussed herein. The computing device 110 may include a power source 922 coupled to the processor 901, such as a disposable or rechargeable battery. The rechargeable battery may also be coupled to the peripheral device connection port to receive a charging current from a source external to the computing device 110.

Various forms of computing devices may be used to implement operations of some embodiments. Such computing devices may typically include, at least, the components illustrated in FIG. 10 which illustrates an example server computing device. Such a server computing device 102 may typically include a processor 1001 coupled to volatile memory 1002 and a large capacity nonvolatile memory, such as a disk drive 1003. The server computing device 102 may also include a floppy disc drive, compact disc (CD) or DVD disc drive 1006 coupled to the processor 1001. The server computing device 102 may also include network access ports 1004 (or interfaces) coupled to the processor 1001 for establishing data connections with a network 1005, such as the Internet and/or a local area network coupled to other system computers and servers.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the principles and novel features disclosed herein.

What is claimed is:

1. A method implemented on a processor of a computer device to manage website tracking, comprising: identifying, by the processor, one or more predefined browsing execution conditions encountered by the computing device during a session with a website; determining, by the processor, whether information associated with the one or more identified predefined browsing execution conditions encountered by the computing device during the session with the website differs from archived data associated with one or more identified predefined browsing execution conditions encountered by the computing device during a previous session with the website; determining, by the processor, that unwanted tracking of the computing device exists in response to determining that the information associated with the one or more identified predefined browsing execution conditions encountered by the computing device during the session with the website differs from the archived data associated with the one or more identified predefined browsing execution conditions encountered by the computing device during the previous session with the website; and performing, by the processor, a corrective action in response to determining that the unwanted tracking of the computing device exists.

2. The method of claim 1, wherein the information associated with the one or more identified predefined browsing execution conditions encountered by the computing device during the session with the website or the archived data associated with the one or more identified predefined browsing execution conditions encountered by the computing device during the previous session with the website includes at least one of an HTML cookie, a script, marker data, an executable code, or any combination thereof.

3. The method of claim 2, wherein determining whether the information associated with the one or more identified predefined browsing execution conditions encountered by the computing device during the session with the website differs from the archived data associated with one or more identified predefined browsing execution conditions encountered by the computing device during the previous session with the website comprises: determining whether links to a document or source within stored data of the session differ from links to a document or source within the archived data associated with the one or more identified predefined browsing execution conditions encountered by the computing device during the previous session with the website; and determining that the unwanted tracking of the computing device exists in response to determining that links to a document or source within the stored data of the session differs from links to a document or source within the archived data associated with the one or more identified predefined browsing execution conditions encountered by the computing device during the previous session with the website.

4. The method of claim 1, wherein performing the corrective action in response to determining that the unwanted tracking of the computing device exists comprises: selecting, by the processor, one or more corrective actions from a plurality of predefined actions based on the one or more identified predefined browsing execution conditions encountered by the computing device during the session with the website; and performing, by the processor, the selected one or more corrective actions.

5. The method of claim 4, wherein the plurality of predefined actions includes at least one of: nullifying stored data associated with the one or more identified predefined browsing execution conditions of the session; adjusting response data requested by the website; blocking access to local data on the computing device; generating a message for a user; generating a configuration file; or terminating the session; or any combination thereof.

6. The method of claim 5, wherein nullifying stored data associated with the one or more identified predefined browsing execution conditions of the session comprises one of deleting the stored data from memory of the computing device, modifying the stored data from the memory of the computing device, or relocating the stored data within the memory of the computing device, or any combination thereof.

7. The method of claim 5, wherein adjusting response data comprises at least one of: randomizing the response data; omitting a portion of information requested by the website; or providing inaccurate or imprecise information within the response data, or any combination thereof.

8. The method of claim 5, wherein blocking access to local data on the computing device comprises preventing tracking elements of the session from reading or writing to a local buffer on the computing device.

9. The method of claim 1, further comprising: generating a report based on the performed corrective action and the one or more identified predefined browsing execution conditions encountered by the computing device during the session with the website; and transmitting the generated report to a remote device configured to aggregate data from a plurality of user computing devices.

10. A computing device, comprising: memory configured to store processor-executable instructions; a processor configured to execute the processor-executable instructions to perform operations comprising: identifying one or more predefined browsing execution conditions encountered by the computing device during a session with a website; determining whether information associated with the one or more identified predefined browsing execution conditions encountered by the computing device during the session with the website differs from archived data associated with one or more identified predefined browsing execution conditions encountered by the computing device during a previous session with the website; determining that unwanted tracking of the computing device exists in response to determining that the information associated with the one or more identified predefined browsing execution conditions encountered by the computing device during the session with the website differs from the information associated with the one or more identified predefined browsing execution conditions encountered by the computing device during the previous session with the website; and performing a corrective action in response to determining that the unwanted tracking of the computing device exists.

11. The computing device of claim 10, wherein information associated with the one or more identified predefined browsing execution conditions encountered by the computing device during the session with the website or the archived data associated with the one or more identified predefined browsing execution conditions encountered by the computing device during the previous session with the website includes at least one of an HTML cookie, a script, marker data, an executable code, or any combination thereof.

12. The computing device of claim 11, wherein the processor is configured to execute the processor-executable instructions to perform operations such that determining whether the information associated with the one or more identified predefined browsing execution conditions encountered by the computing device during the session with the website differs from the archived data associated with one or more identified predefined browsing execution conditions encountered by the computing device during the previous session with the website comprises: determining whether links to a document or source within stored data of the session differ from links to a document or source within the archived data associated with the one or more identified predefined browsing execution conditions encountered by the computing device during the previous session with the website; and determining that the unwanted tracking of the computing device exists in response to determining that links to a document or source within the stored data of the session differs from links to a document or source within the archived data associated with the one or more identified predefined browsing execution conditions encountered by the computing device during the previous session with the website.

13. The computing device of claim 10, wherein the processor is configured to execute the processor-executable instructions to perform operations such that performing the corrective action in response to determining that the unwanted tracking of the computing device exists comprises: selecting one or more corrective actions from a plurality of predefined actions based on the one or more identified predefined browsing execution conditions encountered by the computing device during the session with the website; and performing the selected one or more corrective actions.

14. The computing device of claim 13, wherein the plurality of predefined actions includes at least one of: nullifying stored data associated with the one or more identified predefined browsing execution conditions of the session; adjusting response data requested by the website; blocking access to local data on the computing device; generating a message for a user; generating a configuration file; or terminating the session; or any combination thereof.

15. A computing device, comprising: means for identifying one or more predefined browsing execution conditions encountered by the computing device during a session with a website; means for determining whether information associated with the one or more identified predefined browsing execution conditions encountered by the computing device during the session with the website differs from archived data associated with one or more identified predefined browsing execution conditions encountered by the computing device during a previous session with the website: means for determining that unwanted tracking of the computing device exists in response to determining that the information associated with the one or more identified predefined browsing execution conditions encountered by the computing device during the session with the website differs from the archived data associated with the one or more identified predefined browsing execution conditions encountered by the computing device during the previous session with the website; and means for performing a corrective action in response to determining that the unwanted tracking of the computing device exists.

16. The computing device of claim 15, wherein the information associated with the one or more identified predefined browsing execution conditions encountered by the computing device during the session with the website or the archived data associated with the one or more identified predefined browsing execution conditions encountered by the computing device during the previous session with the website includes at least one of an HTML cookie, a script, marker data, an executable code, or any combination thereof.

17. The computing device of claim 16, wherein means for determining the information associated with the one or more identified predefined browsing execution conditions encountered by the computing device during the session with the website differs from the archived data associated with one or more identified predefined browsing execution conditions encountered by the computing device during the previous session with the website comprises: means for determining whether links to a document or source within stored data of the session differ from links to a document or source within the archived data associated with the one or more identified predefined browsing execution conditions encountered by the computing device during the previous session with the website; and means for determining that the unwanted tracking of the computing device exists in response to determining that links to a document or source within the stored data of the session differs from links to a document or source within the archived data associated with the one or more identified predefined browsing execution conditions encountered by the computing device during the previous session with the website.

18. The computing device of claim 15, wherein means for performing the corrective action in response to determining that the unwanted tracking of the computing device exists based on the one or more identified predefined browsing execution conditions comprises: means for performing one or more corrective actions from a plurality of predefined actions based on the one or more identified predefined browsing execution conditions encountered by the computing device during the session with the website.

19. The computing device of claim 18, wherein means for performing one or more corrective actions from the plurality of predefined actions includes at least one of: means for nullifying stored data associated with the one or more identified predefined browsing execution conditions of the session; means for adjusting response data requested by the website; means for blocking access to local data on the computing device; means for generating a message for a user; means for generating a configuration file; or means for terminating the session; or any combination thereof.

20. The computing device of claim 15, further comprising: means for generating a report based on the performed corrective action and the identified one or more predefined browsing execution conditions of the session; and means for transmitting the generated report to a remote device configured to aggregate data from a plurality of user computing devices.

21. A non-transitory processor-readable storage medium having stored thereon processor-executable instructions configured to cause a processor of a computing device to perform operations comprising: identifying one or more predefined browsing execution conditions encountered by the computing device during a session with a website; determining whether information associated with the one or more identified predefined browsing execution conditions encountered by the computing device during the session with the website differs from archived data associated with one or more identified predefined browsing execution conditions encountered by the computing device during a previous session with the web site; determining that unwanted tracking of the computing device exists in response to determining that the information associated with the one or more identified predefined browsing execution conditions encountered by the computing device during the session with the website differs from the archived data associated with the one or more identified predefined browsing execution conditions encountered by the computing device during the previous session with the website; and performing a corrective action in response to determining that the unwanted tracking of the computing device exists.

* * * * *